US005572375A

United States Patent [19]
Crabtree, IV

[11] Patent Number: 5,572,375
[45] Date of Patent: Nov. 5, 1996

[54] METHOD AND APPARATUS FOR MANIPULATING, PROJECTING AND DISPLAYING LIGHT IN A VOLUMETRIC FORMAT

[76] Inventor: Allen F. Crabtree, IV, 359A R.R. 10, Concord, N.H. 03301

[21] Appl. No.: 152,861

[22] Filed: Nov. 15, 1993

Related U.S. Application Data

[60] Continuation-in-part of Ser. No. 840,316, Feb. 24, 1992, Pat. No. 5,311,335, which is a division of Ser. No. 562,271, Aug. 3, 1990, Pat. No. 5,090,789.

[51] Int. Cl.[6] .............................. G02B 5/10; G02B 27/22
[52] U.S. Cl. ..................... 359/858; 359/479; 359/862; 359/863
[58] Field of Search .................... 359/858, 859, 359/479, 860, 862, 863, 866; 362/811; 353/10, 99

[56] References Cited

U.S. PATENT DOCUMENTS

| | | | |
|---|---|---|---|
| 2,995,973 | 8/1961 | Barnes et al. | 359/859 |
| 3,664,750 | 5/1972 | Hock | 359/858 |
| 4,595,833 | 6/1986 | Sting | 359/859 |
| 4,596,050 | 6/1986 | Rogers | 359/859 |
| 4,655,555 | 4/1987 | Mächler et al. | 359/858 |
| 4,861,148 | 8/1989 | Sato et al. | 359/859 |
| 4,974,957 | 12/1990 | Kaelin | 353/10 |
| 5,004,331 | 4/1991 | Haseltine et al. | 359/858 |
| 5,307,210 | 4/1994 | MacFarlane et al. | 359/859 |

*Primary Examiner*—Paul M. Dzierzynski
*Assistant Examiner*—Darren E. Schuberg
*Attorney, Agent, or Firm*—Gerald Linden

[57] ABSTRACT

The apparent position of a three-dimensional volumetric image can be "translated" or moved away from image generation apparatus by employing an image translation chamber comprising two concave reflectors. In one embodiment, a reduced portion or "sector" of the image translation chamber can be provided to facilitate image translation for a restricted range of viewing angles. In another embodiment, two or more image translation chambers can be "stacked" to provide double translation of a three-dimensional image over a greater distance. In another embodiment of the invention, a bi-convex lens can be used to translate the apparent position of a three-dimensional image. Other aspects of the invention include providing a high-speed opto-mechanical shutter having a plurality of co-planar diametric holes in a cylindrical rod; the use of AOMs to accomplish very high-speed intensity modulation of a coherent light beam, which modulation can be employed to generate a periodic pattern of light "packets" or pulses; and both active and passive multi-planar optical elements used in either a reflective or transmissive mode and optionally provided with interposed layers of switchable liquid crystal material. A gas imaging chamber may be used for displaying three-dimensional images.

7 Claims, 18 Drawing Sheets

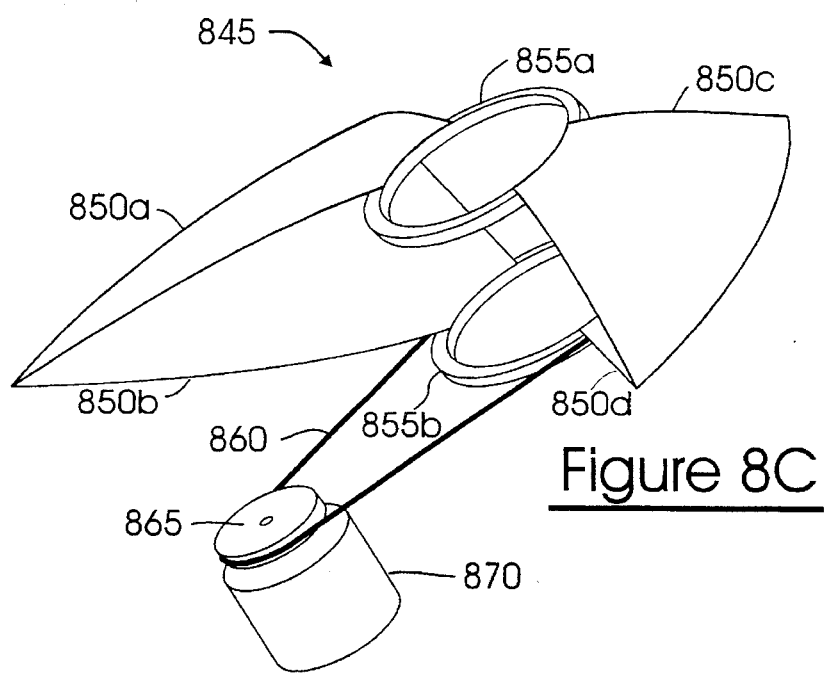
Figure 8C
Figure 8D
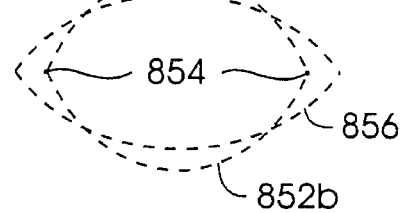
Figure 8E
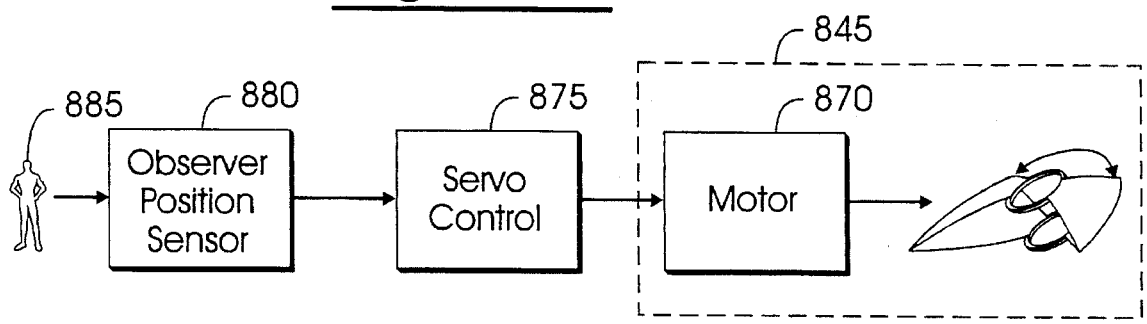

METHOD AND APPARATUS FOR MANIPULATING, PROJECTING AND DISPLAYING LIGHT IN A VOLUMETRIC FORMAT

CROSS-REFERENCE TO RELATED U.S. PATENT APPLICATIONS

This application is a continuation-in-part of commonly-owned, U.S. patent application Ser. No. 07/840,316 filed Feb. 24, 1992 (now U.S. Pat. No. 5,311,335, issued May 10, 1994), which is a division of U.S. patent application Ser. No. 07/562,271 filed Aug. 3, 1990 (now U.S. Pat. No. 5,090,789).

TECHNICAL FIELD OF THE INVENTION

The present invention relates to method and apparatus for generating a three dimensional volumetric image.

BACKGROUND OF THE INVENTION

As the cost and reliability of laser light sources have decreased and increased, respectively, their applications have become increasingly varied and common. One application growing increasingly popular is in the field of entertainment. Laser light sources are being used to create laser light shows, both indoors and outdoors. Indeed, modern concert tours can often be considered disappointing unless a laser light show in included.

Devices for generating laser light shows have suffered and continue to suffer from a number of drawbacks. One drawback is that the devices tend to be rather large and bulky, and therefore difficult to transport. The laser light sources themselves tend to be rather large and bulky, and a series of beam reflectors, e.g. mirrors, and converging means, e.g. lenses, are required to draw the multiple colored laser beams (e.g. red, yellow, green) into close mutual proximity to facilitate their manipulation.

Devices for generating laser light shows typically fail to take advantage of the holography generating capabilities of laser light. Rather, the devices typically will simply use the laser light sources to project brilliantly colored light patterns upon some surface.

Accordingly, a need exists for a laser light show device having an improved design to reduce its size and complexity, and means for advantageously using the laser light to create and enhance holographic imagery.

One area of increasing interest is the area of three-dimensional volumetric displays, particularly computer generated displays. The have been many problems associated with laser illuminated volumetric imaging. These problems include high "flicker" due to slow scanning speed and modulation. The advent of audio-optic (acousto-optic) modulators has dramatically improved modulation speeds, but most techniques remain clumsy and slow.

Most laser displays are merely two-dimensional projections on a two-dimensional surface. Some techniques, such as that described in U.S. Pat. No. 5,148,310, provide a depth component by rapidly spinning or oscillating the two dimensional surface. These techniques, however suffer from point-addressability and viewability problems.

It has long been known in the art that an auto-stereoscopic, three-dimensional volume display can be created by imposing a two-dimensional image on an imaging surface or display screen and the rapidly moving the imaging surface along a third axis. In the method of imaging known as angular multi-planing, the display screen is rotated about an axis so oriented as to cause the image on the screen to sweep through the desired volume of space. One such system is described in Ketchpel, U.S. Pat. No, 3,140,415 which utilizes a phosphorescent rotating screen being illuminated by fixed electron gun means. Serious drawbacks to such a system, related to the lag time of the phosphors have been discussed in detail in Muckerheide, U.S. Pat. No. 4,799,103. Additional drawbacks to such a system arise from the requirement of enclosing the screen and electron gun means in a vacuum. Muckerheide also discusses the evolution of the art towards incorporating lasers as image generation sources. Currently, such use of lasers is widely practiced and is generally preferred.

In general, all of these attempts at generating three-dimensional images utilize two-dimensional image projection techniques with mechanical scanning to produce the illusion of a third dimension. Because of limited scanning speed, image complexity must be limited to avoid excessive flicker. With these techniques, the use of phosphorescent screens to improve persistence of the image merely causes the image to smear in space.

SUMMARY OF THE INVENTION

A laser light show device in accordance with the present invention has an improved design and layout which reduces its mechanical size and complexity. The present invention advantageously uses the holography generating capability of laser light to produce projected images having enhanced holographic effects. The object image is projected onto a background having up to three types of background images. One type of background image is the projection of a reference beam created by reflecting a laser light beam off a rotating wobbler plate and diffracting the wobbled light beam through a spherical crystal lens. (It should be understood, however, that the present invention is not limited to holographic, wave-front type, techniques for generating visible three-dimensional appearing images.)

A second background image is generated by diffracting a laser light beam through a slowly rotating cylindrical amorphic dipolyhedral lens. A third background image is generated by diffracting a laser light beam through two diffraction gratings, wherein one diffraction grating is moving relative to the other.

The present invention uses a novel laser light beam shutter to effectively turn on and off, e.g. modulate, the laser light beam. The invention's shutter consists of a substantially opaque rod mounted and driven to rotate about its longitudinal axis. The rod has a substantially cylindrical hole perpendicular to its longitudinal axis. As the rod spins, the hole becomes alternately concentric and non-concentric with the laser light beam, thereby allowing the laser light beam to pass freely or become effectively blocked.

The present invention provides a means for projecting a suspended holographic image. Multiple laser light beams modulated by object image information are projected equiangularly about the equator of a substantially spherical body having a white periphery with a matte finish. The spherical body is centrally located within one of two opposing parabolic reflectors. The second parabolic reflector has a centrally located aperture through which a holographic image is projected. The holographic image converges just beyond the aperture and just outside the paraboloid formed by the opposing parabolic reflectors.

It is a further object of the present invention to provide a technique for presenting three-dimensional volumetric images in a manner that hides the image generation apparatus from the user.

It is a further object of the present invention to provide a technique for displacing the apparent position of a three-dimensional image.

It is a further object of the present invention to provide a technique for producing a virtual image which appears to hover in space and which is physically removed from any delicate or dangerous image generation apparatus.

It is a further object of the present invention to provide a technique for displacing the apparent position of a three-dimensional image which minimizes the "bulk" of the image translation apparatus.

It is a further object of the present invention to provide novel techniques for generating, scanning and forming three-dimensional images in a volumetric format by manipulating coherent radiation (e.g., laser light).

In producing three-dimensional images, it is generally preferable to hide image generation apparatus from the viewer to enhance the visual effect. Light from stray sources (e.g., lasers), extraneous reflections, and the sight of bulky equipment can be quite distracting to a viewer.

According to the invention, the apparent position of a three-dimensional volumetric image can be "translated" or moved away from the image generation apparatus, seemingly suspending the image in space. This is accomplished by employing an image translation chamber comprising two concave reflectors. Inner surfaces of the concave reflectors are provided with a highly reflective "mirror" finish. The two reflectors are arranged such that their concave inner surfaces face one another, one above the other. Preferably the concave shape of the inner surfaces is either parabolic or a spherical approximation to a parabolic shape. Each reflector has a centrally located opening or aperture, permitting an observer to look into the opening in the upper reflector. The opening in the lower reflector is positioned over three-dimensional image generation apparatus which creates a three-dimensional image at or above the opening in the lower reflector. To the viewers eye, the apparent position of the image is moved to a position at or above the opening in the upper reflector. This translation of the "real" three-dimensional image is caused by internal reflections between the concave reflectors.

The image translation chamber can be used in conjunction with any method of generating a volumetric image at or above the opening in the lower reflector to produce a corresponding perceived "virtual" image at or above the opening in the upper reflector.

According to an aspect of the invention, a reduced portion or "sector" of the image translation chamber can be provided to facilitate image translation for a restricted range of viewing angles. Evidently, in viewing a "virtual" image from one viewpoint, the viewer only makes use of a small portion of the reflector surfaces.

According to another aspect of the invention, a "sector" image translation chamber can be made to accommodate a wide range of viewing angles by rotating the "sector" image translation chamber to follow a single observer's viewing position.

According to another aspect of the invention, a "sector" image translation chamber can be spun rapidly to accommodate a large number of observers and viewing angles simultaneously. Image persistence in the viewer's eye creates image cohesion.

According to another aspect of the invention, two or more image translation chambers can be "stacked" to provide double translation of a three-dimensional image over a greater distance.

According to another aspect of the invention, a bi-convex lens can be used to translate the apparent position of a three-dimensional image.

According to another aspect of the invention, centrifugal forces generated by rotating a "sector" image translation chamber can be used to bend a non-parabolic shaped concave reflector into a parabolic shape. This is accomplished by providing a flexible coupling between upper and lower reflectors of a "sector" image translation chamber. If the upper and lower reflectors are sufficiently flexible, then the centrifugal force generated by spinning them causes them to spread outward and assume a broader shape. Assuming that the initial shape of the reflectors is taller and narrower than the desired parabolic shape, then the spreading action caused by spinning will cause them to closer approximate the desired parabolic shape.

According to the invention, a high-speed opto-mechanical shutter is formed by providing a plurality of co-planar diametric holes in a cylindrical rod. Aligning the rod with a light beam path and rotating the rod causes holes in the rod to line up with the light beam permitting transmission thereof, or to block the light beam, effectively cutting it off.

According an aspect of the invention, the shutter rod can be provided with a dark or matte finish (e.g., by anodizing an aluminum rod) to prevent unwanted reflections.

Further, according to the invention, AOM's (acousto-optic modulator devices) can be used to accomplish very high-speed intensity modulation of a coherent light beam. This modulation can be accomplished in a manner which generates a periodic pattern of light "packets" or pulses. Subsequent image generation apparatus which is "tuned" to the period of the pattern of light pulses can be used in a reflected mode to permit depth addressing.

According to another aspect of the invention, an active multi-planar optical element (MPOE) can be used in either a reflective (scanning) mode or in an opaque (image-forming) mode. The active multi-planar optical element comprises a series of parallel transparent (preferably glass) plates, separated from one another by monolithic liquid crystal layers. Each liquid crystal layer is provided with a pair of transparent electrodes for the purpose of "activating" the liquid crystal material. By controlling the "state" of selected liquid crystal layers, the layers can be switched between a transparent, light-transmissive state and a reflective state. In its reflective mode, the active multi-planar optical element is used by directing a collimated light beam into the MPOE at an oblique angle. The beam passes substantially unaffected through any layers in the transparent state and is reflected by the first layer it encounters in the reflective state. Anti-reflective coatings can be used on the transparent layers to prevent unwanted reflections. Because of the oblique angle of incidence, the position of the reflected beam depends upon which liquid crystal layer reflects it. By "scanning" the liquid crystal layers, the various reflected beam positions are correspondingly scanned, providing a completely solid-state one-dimensional scanning mechanism. Any number of layers can be provided. Unlike beam-deflection techniques (e.g., galvo-scanning and acousto-optic beam deflectors (AOBD's) ) the reflected scanning beams from the active MPOE are parallel.

In the opaque or "imaging" mode, a liquid crystal layer is controlled (via the electrodes) into an opaque state. Wherever an incident light beam strikes the opaque layer, a spot of light is formed. By performing a two-dimensional scan of a light beam over the opaque layer, the layer acts as a "screen" and a viewable two-dimensional image is formed on the opaque layer. By repeating this process for each of the liquid crystal layers in turn, a depth component is added, providing a viewable three-dimensional image inside the active multi-planar optical element.

According to another aspect of the invention, a passive multi-planar optical element comprises a plurality of spaced apart planar transparent (preferably glass) layers, each layer having two parallel planar surfaces. Constant spacing between the transparent layers is maintained by spacers (preferably transparent) disposed between the layers at the edges.

Like the active multi-planar optical element, the passive multi-planar optical element modes of use: a "reflective" mode and an "image" mode. In the "reflecting" mode, an incident beam of light is directed into the multi-planar optical element 1140 at an angle. Each surface of each transparent layer acts as a reflecting surface, since at each surface there is a change of refractive coefficient (e.g., glass to air). As the beam penetrates the transparent layers, a portion of the light energy in the beam is reflected off of each surface, forming a plurality of parallel reflected beams. If a rapidly modulated light source is used, then the reflected beams differ from one another in time. The first reflected beams are advanced in modulation "phase" relative to later modulated beams. This "phase" relationship can be used to advantage in interferometric applications.

In the "image forming" mode of usage, the passive multi-planar optical array is employed to form a plurality of visible image "dots". A perpendicular incident beam passes through the layers of the transparent multi-planar optical element, forming a visible "dot" at each change of refractive index (i.e., at each surface of each transparent layer where there is a gas to transparent medium (e.g., glass to air) transition. In conjunction with very high speed modulation and reflective reinforcement, the intensity of individual dots can be controlled. In conjunction with further scanning, two-dimensional visible images can be formed on each of the surfaces of each of the transparent layers, thereby creating a visible three-dimensional image inside the multi-planar optical array which can be viewed by an observer.

According to an aspect of the invention, a pair of passive (or active) multi-planar optical arrays can be used in cascade to produce a rectangular array of parallel light beams from a single incident beam.

According to another aspect of the invention, a gas imaging chamber can be employed to produce three-dimensional images in a gaseous medium. The gas imaging chamber is formed inside a transparent outer shell. The shell is filled with an imaging gas (preferably an inert gas, e.g., helium, neon, argon, xenon, etc.). Two parallel front-surface mirror finishes are provided on opposite inside surfaces of the chamber. One of the mirror finishes is of the partially transmissive type, permitting a light beam to enter the imaging chamber therethrough. The distance between the two mirror finishes is one half the distance traveled by a beam of light in the imaging gas over a time interval "$\tau$" corresponds to a repetition interval over which high-speed modulation provides a repeating sequence of light "packets" or pulses. The modulated beam enters the chamber 1500 at an angle perpendicular to the partially transmissive mirror finish. The beam passes through the gaseous medium and is reflected back and forth between the two reflectors. The reflections occur back and forth along the same path. Since the beam reflection path within the chamber is exactly one half of the pulse waveform period "$\tau$" on the incident beam, subsequent pulse periods on the incident beam will reinforce one another. The pulses travel through the gaseous medium at the speed of light in the gaseous medium, but depending upon pulse (packet) spacing, will periodically encounter ("collide" with) and reinforce a reflected pulse on a returning (reflected) beam, and if sufficient light energy is transferred to the gas molecules, they will emit photons of visible light at the point of reinforcement. The gaseous medium can be "biased" with an energy source (in a manner similar to that used in "pumped" lasers), to reduce the amount of pulse (or packet) energy required to cause photon emission in the gaseous medium.

The modulated beam need not be of a visible light wavelength, since it is only necessary that secondary emissions from the imaging gas provide visible light. Accordingly, the "mirrored" surfaces can be frequency selective, reflecting only the wavelength of the incident beam and transmitting all other wavelengths of light.

By providing a two-dimensional parallel-ray scanning beam, modulated (e.g., by AOM's) to produce an image at a specific depth in the image chamber, a two dimensional visible image is formed at the selected depth. By repeating the process rapidly for a plurality of different depths within the chamber, a viewable three-dimensional image is formed.

Since the three-dimensional images are generally produced in pairs, only one of the images is likely to be used. It is possible to "hide" the redundant image either by blocking that portion of the imaging chamber, or by applying bias potential to the imaging gas only in the vicinity of the desired image.

These and other objects, features and advantages of the present invention will be readily understood upon consideration of the following detailed description of the invention and the accompanying drawings. Other objects, features and advantages of the invention will become apparent in light of the following description thereof.

BRIEF DESCRIPTION OF THE DRAWINGS

Throughout the figures similar elements are indicated by like numerals.

FIG. 8c is a view of a "sector" image translation chamber, and means for controlling its angular position, according to the invention.

FIG. 8d is a cross-sectional view illustrating a "spreading" effect of spinning a flexible "sector" image translation chamber, according to the invention.

FIG. 8e is a block diagram of a system for controlling the angular position of a "sector" image translation chamber according to an observer's position, according to the invention.

DETAILED DESCRIPTION OF THE INVENTION

Figure 1A:
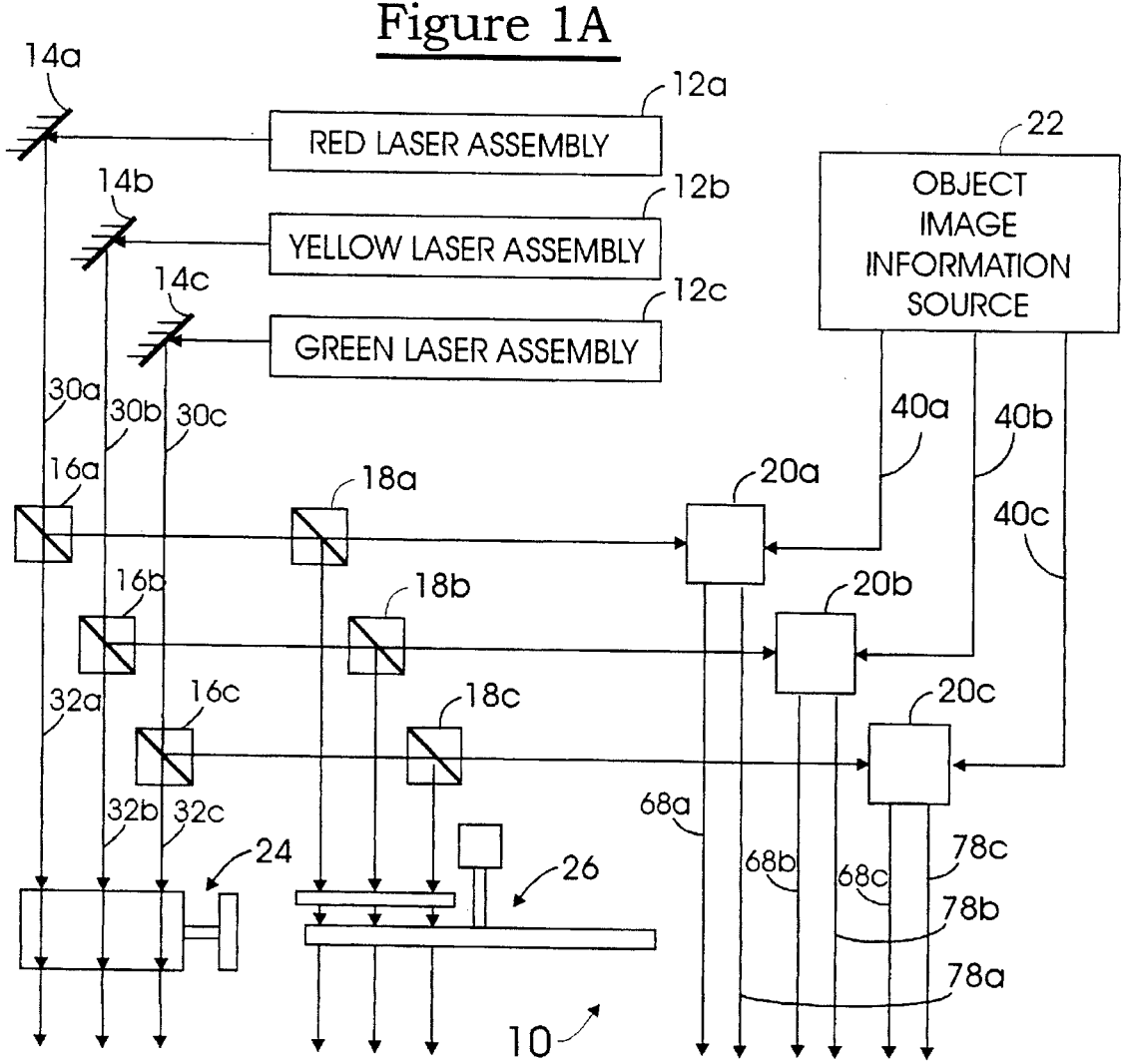
FIG. 1A is a block diagram of a laser light show device in accordance with the present invention.

Referring to FIG. 1A, a laser light show device 10 in accordance with the present invention consists of the following elements, coupled as shown: multiple colored laser assemblies 12a–12c; dielectric mirrors 14a–14c; multiple beam splitters 16a–16c, 18a–18c; multiple reference and object beam generator assemblies 20a–20c; an object information source 22; an amorphic dipolyhedral lens assembly 24; and a diffraction gratings assembly 26.

As shown in FIG. 1A, three laser light assemblies 12a–12c, preferably having red, yellow and green laser light sources, are used in a preferred embodiment of the present invention. However, it will be appreciated that any number of colors of laser light sources can be used in accordance with the present invention as described below.

Each laser assembly 12a–12c emits an incident laser beam 28a–28c which is reflected off a dielectric mirror 14a–14c. The reflected laser beams 30a–30c pass through the first set of beam splitters 16a–16c, producing secondary incident laser beams 32a–32c and secondary reflected laser beams 34a–34c. As described more fully below, the secondary incident laser beams 32a–32c are diffracted through the amorphic dipolyhedral lens assembly 24 prior to projection.

The secondary reflected laser beams 34a–34c are passed through the second set of beam splitters 18a–18c, producing tertiary incident laser beams 36a–36c and tertiary reflected laser beams 38a–38c. As described more fully below, the tertiary reflected laser beams 38a–38c are passed through the diffraction gratings assembly 26 prior to projection.

The beam splitters 16a–16c, 18a–18c can be selected according to subjective desires regarding the relative beam intensities of the resulting laser beams 32a–32c, 34a–34c, 36a–36c, 38a–38c. For example, the first beam splitters 16a–16c can be selected to allow approximately 30% of the intensities of the reflected laser beams 30a–30c to pass through as the secondary incident laser beams 32a–32c, with the remaining intensities reflecting as the secondary reflected laser beams 34a–34c.

The tertiary incident laser beams 36a–36c are coupled into the reference and object beam generators 20a–20c for processing prior to projection of the reference 78a–78c and object 68a–68c beams. As explained more fully below, object image information signals 40a–40c from the object image information source 22 are also coupled into the reference and object beam generators 20a–20c for use in processing the tertiary incident laser beams 36a–36c prior to projection of the reference 78a–78c and object 68a–68c beams.

The object image information signals 40a–40c, supplied by the object image information source 22, can contain virtually any type of image data. For example, the object image information signals 40a –40c can represent graphics data, such as that used in an engineering workstation, a video game or medical imaging applications.

As seen in FIG. 1A, the dielectric mirrors 14a–14c are staggered horizontally so that the incident laser beams 28a–28c produce reflected laser beams 30a–30c which are similarly horizontally staggered. By appropriately staggering the dielectric mirrors 14a–14c horizontally, the reflected laser beams 30a–30c can be proximally located adjacent to one another at distances on the order of several millimeters. Thus, the horizontal spacing of the reflected laser beams 30a–30c can be substantially less than the horizontal spacing of the incident laser beams 28a–28c, which is dictated by the physical dimensions of the laser assemblies 12a–12c (typically on the order of several inches).

Figure 1B:
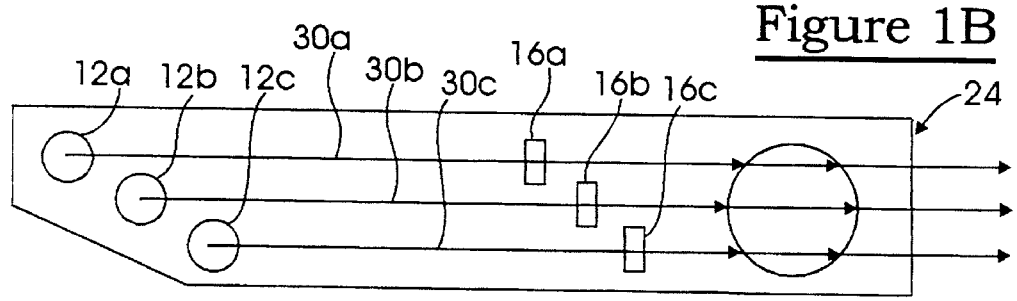
FIG. 1B is a side view of the invention illustrating the mechanical mounting of the laser assemblies.

As shown in FIG. 1B, the laser assemblies 12a–12c can be mounted along an inclined plane 42. By mounting the laser assemblies 12a–12c in this fashion, the vertical spacing of the reflected laser beams 30a–30c can also be established to be on the order of several millimeters. Just as with the horizontal spacing constraints imposed by the physical sizes of the laser assemblies 12a–12c, the vertical spacing would otherwise be substantially greater.

Therefore, by appropriately staggering the dielectric mirrors 14a–14c horizontally, and mounting the laser assemblies 12a–12c along a properly inclined plane 42, the reflected laser beams 30a–30c can be proximally located adjacent one another as desired.

Figure 2:
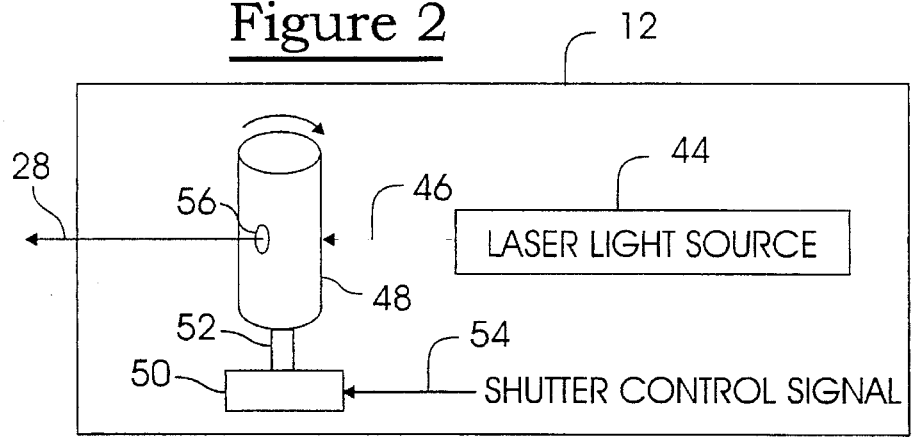
FIG. 2 illustrates a laser light shutter assembly in accordance with the present invention.

Referring to FIG. 2, each laser assembly 12 contains a laser light source 44, which produces an original laser beam 46, and a shutter 48, which is driven by a shutter motor 50 through a coupling shaft 52. As described further below, the shutter motor 50 is controlled by a shutter control signal 54. The original laser beam 46 produced by the laser light source 44 is modulated by the shutter 48 to produce the incident laser beam 28. This modulation is done by rotating the shutter 48. As the shutter 48 rotates, a hole 56 in the shutter, perpendicular to the axis of rotation, alternates between being aligned and non-aligned with the original laser beam 46. When the hole 56 is in alignment with the original laser beam 46, the incident laser beam 28 is produced. This means of modulating the original laser beam 46 produces an incident laser beam 28 which can be effectively turned on and off very quickly.

Figure 3A:
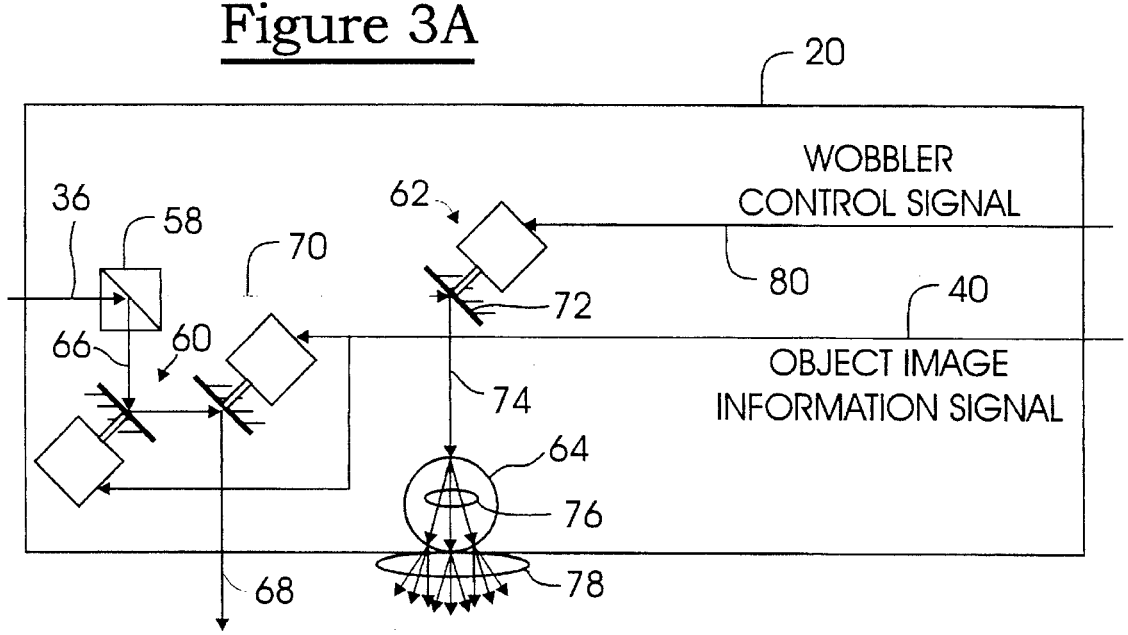
FIG. 3A is a block diagram of the invention's reference and object beam generator.

Referring to FIG. 3A, the reference and object beam generator assembly 20 consists of the following elements, coupled as shown: a beam splitter 58; an x-y scanner assembly 60; a wobbler plate assembly 62; and a spherical lens 64.

The tertiary incident laser beam 36 enters the reference and object beam generator assembly 20 and passes through the beam splitter 58. The reflected beam 66 is reflected through the X-Y scanner assembly 60 to produce the object beam 68 for projection. The X-Y scanner assembly 60 is driven by the object image information signal 40, appropriately scanning, i.e. deflecting, the reflected beam 66 in the X- and Y- directions to produce the object beam 68 for projection.

The non-reflected beam 70 exiting the beam splitter 58 is reflected off a wobbler plate assembly 62. The dielectric mirror 72 of the wobbler plate assembly 62 rotates in a non-planar manner. The non-reflected beam 70 strikes the wobbling mirror 72 slightly off center, thereby striking a wobbling mirror surface. This produces a wobbling reflected beam 74 which spins conically about a central axis.

Figure 3B:
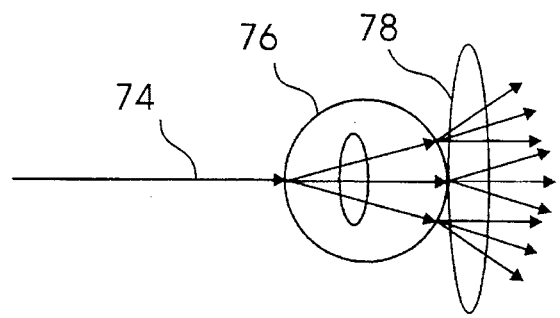
FIG. 3B illustrates the double hemispherical diffraction produced by a spherical lens in accordance with the present invention.

The wobbling beam 74 is passed through the spherical lens 64 to produce a singly hemispherically diffracted beam 76 and then a doubly hemispherically diffracted beam 78. As shown in FIGS. 3A and 3B, the single and double diffraction patterns are hemispherical in the sense that the diffraction patterns extend in both the vertical and horizontal directions.

In a preferred embodiment, the spherical lens 64 is constructed of substantially optically pure quartz crystal. The latticed structure of the quartz crystal enhances the regularity and uniformity of the diffraction properties of the spherical lens 64. This results in more uniform hemispherically diffracted beams 76, 78.

Both the object image beam 68 and reference image beam 78 are projected together. When so projected, the reference image beam 78 serves as a dim background providing a sensation of parallax, while the object image beam 68 provides the subject image. The overall holographic effect can be enhanced by selectively synchronizing the wobbler control signal 80 with the shutter control signal 54.

By selectively controlling the rotational speed of the wobbling dielectric mirror 72, relative to the rotational speed of the shutter 48, the relative wobbling circular motion of the wobbling beam 74, relative to the on-off modulation of the incident laser beam 28, and therefore the non-reflected beam 70, produces a reference image beam 78 having variable stasis. By varying the relative rotational speeds of the wobbling mirror 72 and shutter 48, the reference beam 78 can be selectively provided with negative stasis, wherein the reference beam pattern appears to rotate counterclockwise, or positive stasis, wherein the reference beam pattern tends to rotate clockwise. This produces an overall effect of making the projected object image appear to recede or approach the viewer.

Another X-Y scanner (not shown) can be used in line with the non-reflected beam 70. By "averaging" the object image information signal 40, the X-Y, i.e. planar, center of the object image can be represented. Such an "averaged" object image information signal can then be used to drive the X-Y scanner for the non-reflected beam 70. This would produce a wobbling beam 74, and therefore a reference beam 78, which projects a reference image which is substantially centered about the projected object image.

Figure 4A:
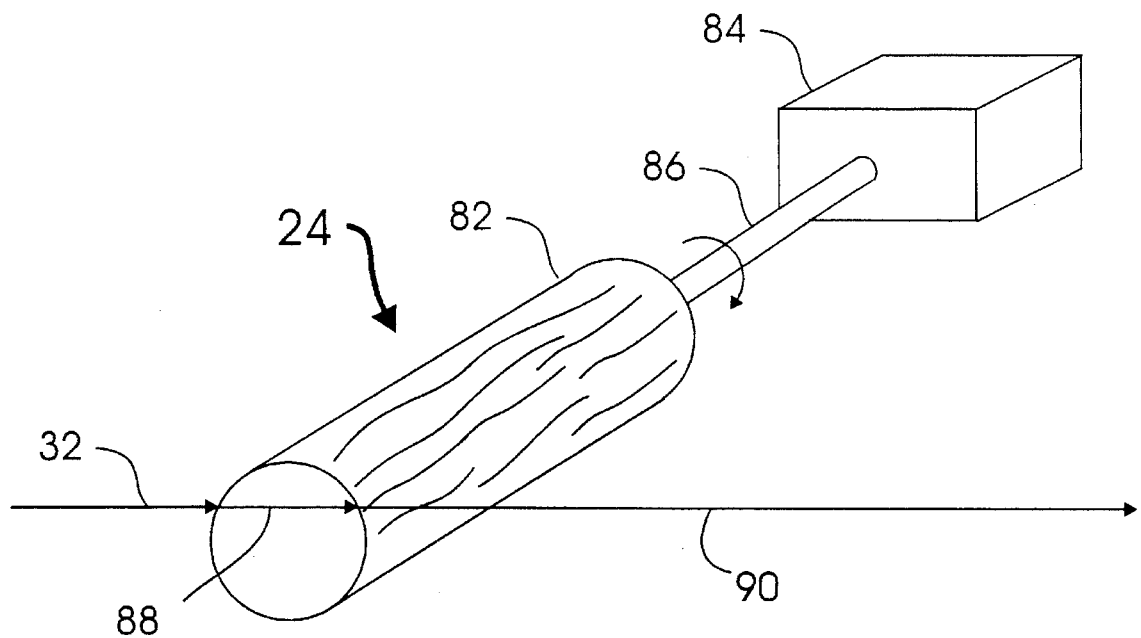
FIGS. 4A–4B illustrate the invention's amorphic dipolyhedral lens assembly.
Figure 4B:
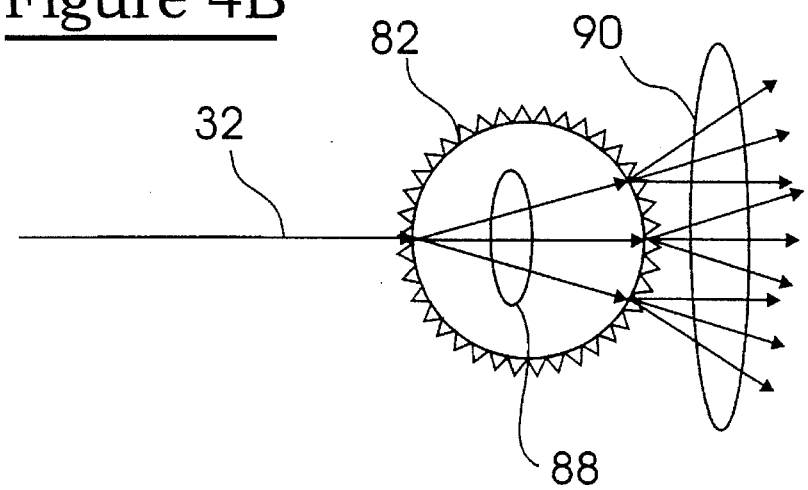

Further projected background image information can be provided by using the amorphic dipolyhedral lens assembly 24, as shown in FIGS. 4A–4B. The lens assembly 24 consists of an amorphic dipolyhedral lens 82 rotated by a motor 84 via a shaft 86. The rotational speed of the lens 82 can be set at any speed subjectively deemed desirable, based upon the visual effect produced. The secondary incident laser beam 32 enters the lens 82, producing a singly vertically diffracted beam 88. The singly vertically diffracted beam 88, exits the lens 82, producing a doubly vertically diffracted beam 90. FIG. 4B illustrates this vertical diffraction in more detail. The amorphic dipolyhedral lens 82 is a hollow cylinder constructed of glass with irregular longitudinal protrusions, e.g. knurls, about its periphery. In a preferred embodiment, glass is preferred over crystal to take advantage of the non-latticed structure of glass. This non-latticed structure, in conjunction with the longitudinal outer surface irregularities, enhance the amorphic diffraction properties of the lens 82. An experimental version of the lens 82 was constructed from an empty Finlandia (TM) vodka bottle.

Figure 5:
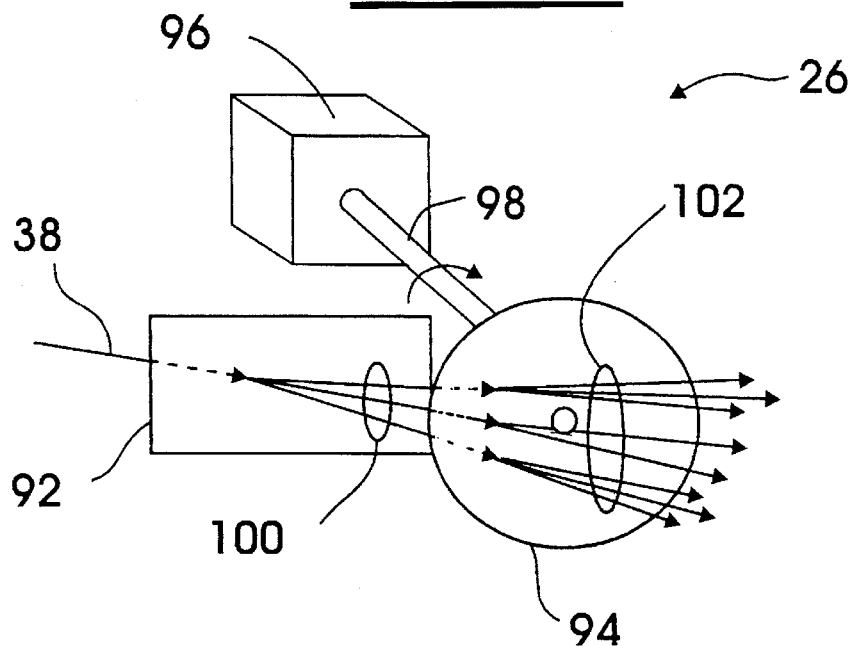
FIG. 5 illustrates the invention's diffraction gratings assembly.

Still further background image information can be projected to further enhance the holographic effect of the laser light show device in accordance with the present invention. Such additional background image information can be provided with the diffraction gratings assembly 26. Referring to FIG. 5, the tertiary reflected laser beam 38 first passes through a fixed diffraction grating 92. This produces a singly diffracted beam 100, which is passed through a rotating diffraction grating 94, producing a doubly diffracted beam 102. The rotating diffraction grating 94 is rotated by a motor 96 via a shaft 98.

In an alternative embodiment, the first diffraction grating 92 can also be rotated, either in a direction counter to that of the rotational direction of the first rotating diffraction grating 94, or in the same direction but at a different speed. This double diffraction of the laser beam 38 through multiple diffraction gratings moving relative to one another produces a background image beam 102 which imparts a further sensation of motion which enhances the holographic effect of the displayed object image.

Figure 6:
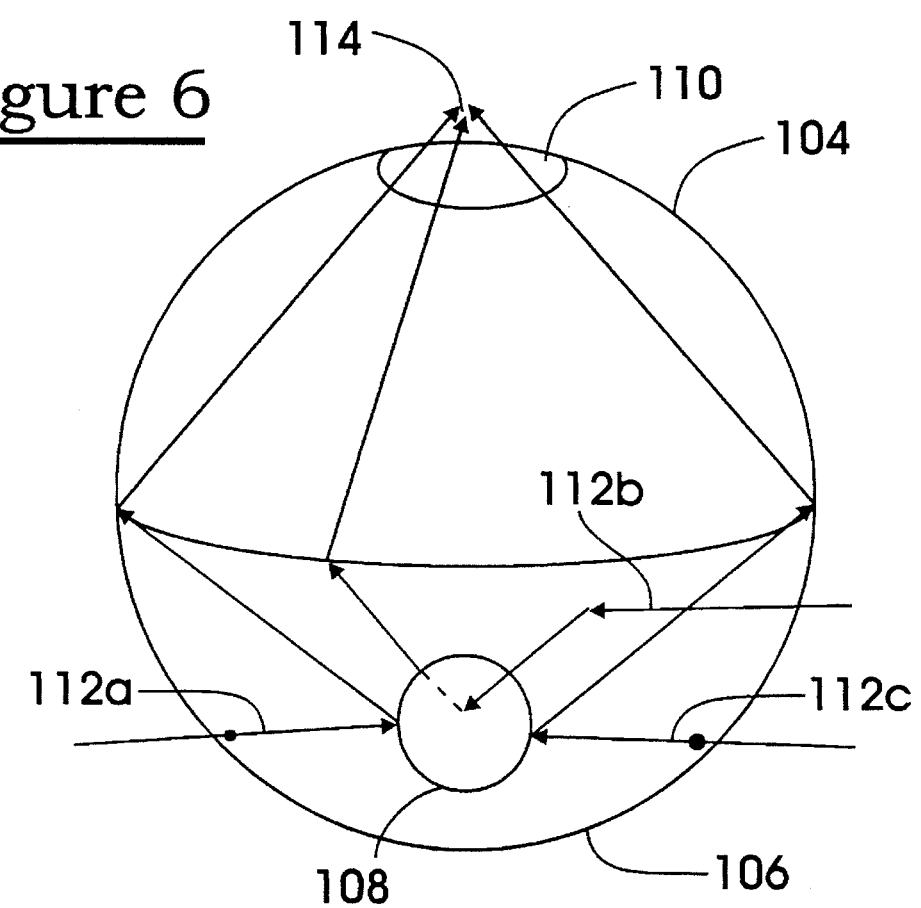
FIG. 6 illustrates the invention's holographic suspension projector.

As stated above, the background and object image information need not be projected onto a surface, but can be projected to produce a suspended holographic image. This can be accomplished by using a holographic suspension projector as shown in FIG. 6.

Top and bottom opposing concave reflective saucers 104, 106, preferably parabolic reflectors, are used. Centrally located within the bottom reflector 106, is a substantially spherical image reflector 108. The image reflector 108 should have a substantially white surface with a matte, i.e. not glossy, finish. For example, a white plastic material can be used, however, a white ceramic material will produce a better image.

Centrally disposed within the top reflector 104 is an aperture 110. Object image information modulated onto multiple laser beams 112a–112c is projected substantially equiangularly about the equator of and onto the image reflector 108. The multiple images thereby produced on the image reflector 108 are reflected within the parabolic reflectors 104, 106 and converge at a point 114 just beyond the aperture 110. This converging image information produces a holographic image which appears to be suspended just above the aperture 110.

The object image information modulating each of the laser beams 112a–112c can be identical, thereby producing a suspended holographic image which appears substantially identically regardless of the horizontal viewing perspective. Alternatively, the object image information modulating each of the laser beams 112a–112c can represent different views of the same subject, thereby producing a suspended holographic image which appears to be three-dimensional as the horizontal viewing perspective changes.

It should be understood that various alternatives to the embodiments of the present invention described herein can be employed in practicing the present invention. It is intended that the following claims define the scope of the present invention and that structures and methods within the scope of these claims and their equivalents be covered thereby.

In producing three-dimensional images, it is generally preferable to "hide the works" from the viewer. That is, the effect of a three dimensional image is significantly enhanced if the viewer cannot see the apparatus that creates it. In order to produce a three dimensional image, it may be necessary to employ bulky, obtrusive equipment. Light from stray sources (e.g., lasers), extraneous reflections, and the sight of bulky equipment can significantly detract from the impact of a three-dimensional image on a viewer. Further, there is often a temptation for viewers to attempt to "touch" or "handle" the image that they see. Certain types of image generation apparatus are either very delicate or very dangerous. In either case, it is imperative that the apparatus be rendered physically inaccessible by the viewer, while maintaining full viewability of the image.

It is possible, however, to "translate" or move a "volumetric" three-dimensional image away from the image generation apparatus, seemingly suspending the image in space. This is accomplished in a manner similar to that described with respect to FIG. 6.

Figure 7A:
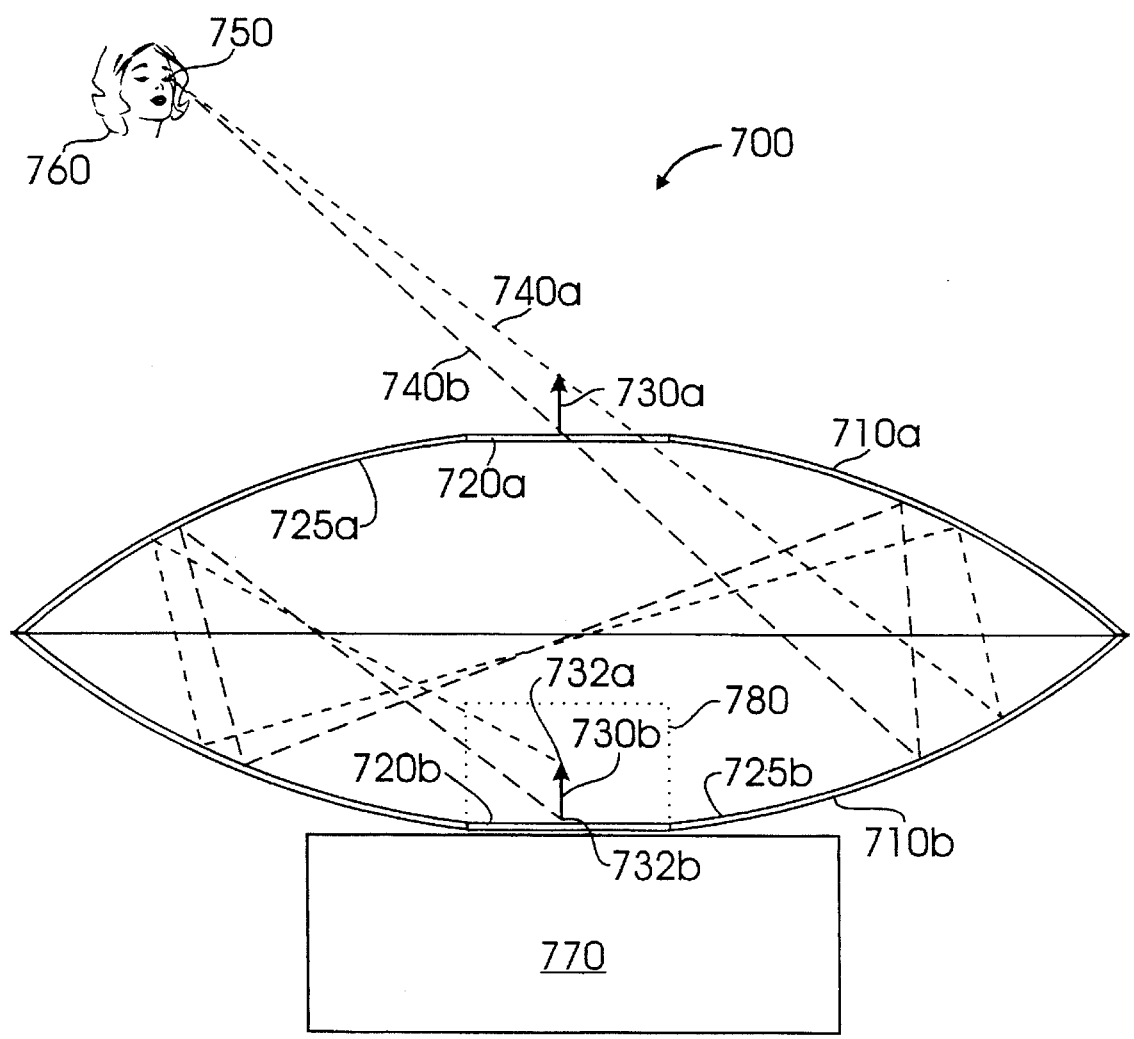
FIG. 7a is a cross-sectional view of apparatus for translating the apparent position of a generated three-dimensional image, according to the invention.

FIG. 7a is a cross-sectional view of a portion of a three dimensional display system 700 employing an image translation chamber (similar to the holographic suspension projector shown in FIG. 6). The image translation chamber comprises two concave reflectors 710a and 710b. Inner surfaces 725a and 725b of the concave reflectors 710a and 710b, respectively, are provided with a highly reflective "mirror" finish. The two reflectors 710a and 710b are arranged such that their concave inner surfaces 725a and 725b, respectively, face one another. Preferably the concave shape of the inner surfaces 725a and 725b of the reflectors 710a and 710b, respectively, are either parabolic or spherical approximations to a parabolic shape. Each reflector 710a and 710b has a centrally located opening or aperture 720a and 720b, respectively. The reflector 710a is positioned above the reflector 710b, such that an observer 760 can look into the opening 720a in the upper reflector 710a. (The terms "upper" and "lower" refer to the apparatus as illustrated in the FIG. One of ordinary skill in the art will realize that the image translation chamber will operate in any orientation as long as the relative positions of the two reflectors 710a and 710b remain unaltered). The opening 720b in the lower reflector 710b is positioned over three-dimensional image generation apparatus 770, which creates a three-dimensional image 730b at or above the opening 720b in the lower reflector 720. To the viewers eye 750, the apparent position of the image 730b is shown generally as 730a, above the opening 720a in the upper reflector. This translation of the "real" three-dimensional image 730b is caused by internal reflections between the concave reflectors which cause the viewer 760 to perceive the "virtual" image 730a, as illustrated by trace lines 740a and 740b from the viewer's eye 750 to the top 732a and bottom 732b, respectively, of the three-dimensional image 730b. Dashed line 780 indicates a general image formation area for which a translated or moved three-dimensional image will appear above the opening 720a in the upper reflector 710a. (In fact, those portions of the "real" image 730b which extend below the opening 720b in the lower reflector 710b will appear in the "virtual" image 730a below the opening 720a in the upper reflector 710a. The viewability of an image below the openings, however, is somewhat restricted by the inability of certain reflection angles to "reach" portions of the image blocked by the edges of the openings 720a and 720b.)

It will be readily appreciated by one of ordinary skill in the art that any method of generating a "real" image (e.g. 730b) at or above the opening 720b in the lower reflector 710b will produce a corresponding perceived "virtual" image (e.g. 730a) at or above the opening 720a in the upper reflector 710a. One suitable image generation technique is described in U.S. Pat. No. 5,148,310, issued Sep. 15, 1992 to Batchko (hereinafter BATCHKO). Using the BATCHKO technique, the rotating flat screen may be positioned inside the opening 720b in the lower reflector 710b. Another suitable image generation technique is to use a holographic image or projection, such as a transmission hologram positioned such that the "real" image of the hologram appears inside the lower reflector 710b. Other suitable three-dimensional image generation techniques are described in greater detail hereinbelow.

Evidently, in viewing a "virtual" image (e.g., 730a) from one viewpoint, the viewer (760) only makes use of a small portion of the reflector surfaces. This presents the possibility that only a reduced portion or "sector" of an image translation chamber is required to view a three-dimensional virtual image from a single viewpoint. An image translation chamber "segment" suited to single or restricted viewpoint viewing of an image is described with respect to FIG.

Figure 7B:
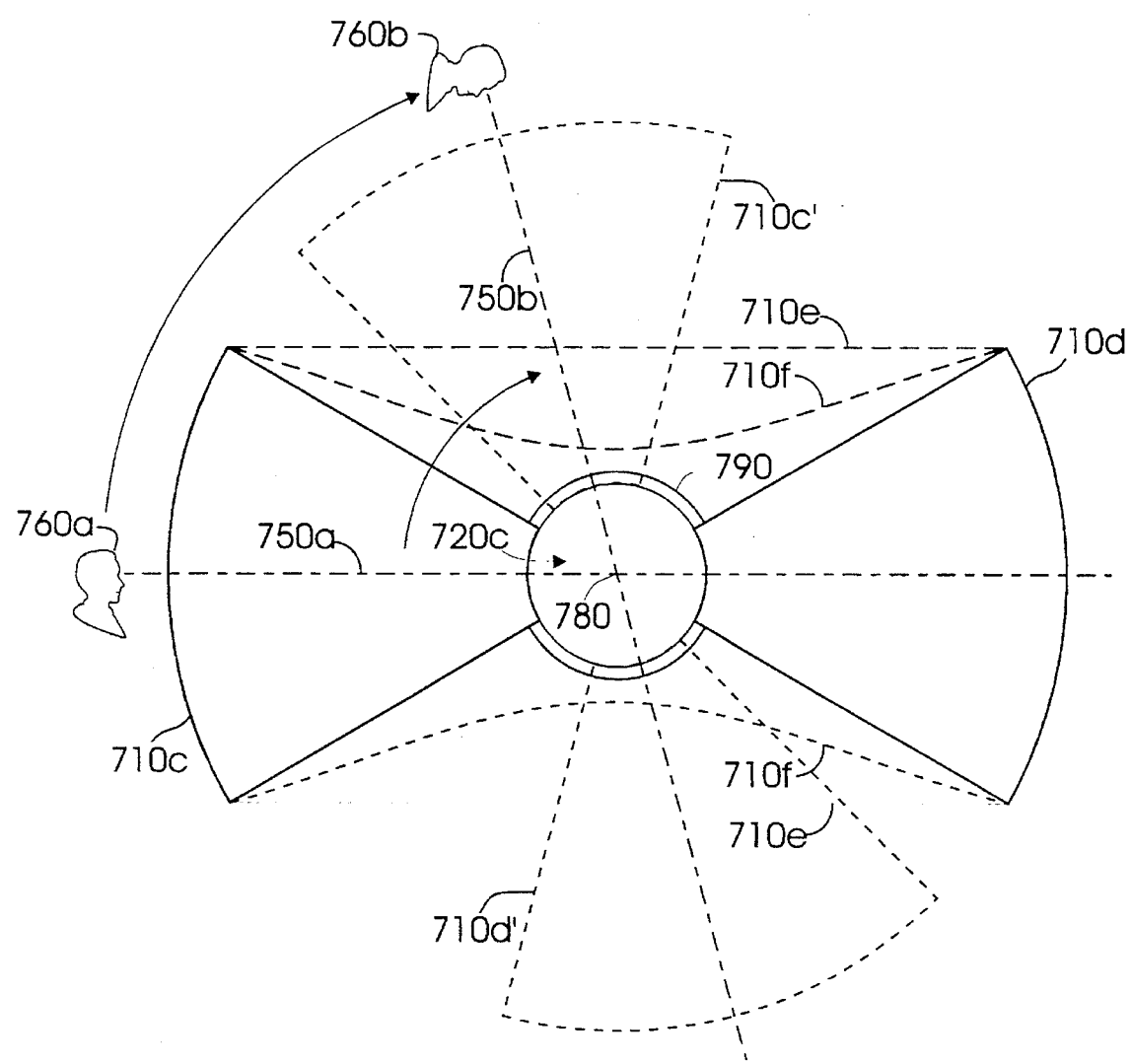
FIG. 7b is a top view of a "sector" image translation chamber, according to the invention.

FIG. 7b is a top view of an image translation chamber similar to that described with respect to FIG. 7a, but where only a portion of the reflectors is provided. A ring 790 defines the viewing opening 720c. Concave "sector" reflectors 710c and 710d are provided on opposite sides of the ring 790, centered about a viewing line 750a along which a viewer can view a "virtual" image at or above (and to some extent, below, as described above) the viewing opening 720c. The "sector" reflectors 710c and 710d are simply cutaway portions of complete concave reflectors (e.g., 710a and 710b, FIG. 7a), and each has an upward facing lower reflector portion and a downward facing upper reflector portion (not visible in top view). The "sector" reflectors 710c and 710d (shown in solid lines) are completely separate from one another and are held in position by the ring 790. Alternatively, joined "sector" reflectors can be provided as single-piece upper and lower reflector portions. Outlines 710e and 710f for "sector" reflectors of this type are shown in dashed lines. (If single piece "sector" reflectors are used, a supporting ring 790 may not be necessary. However, an viewing opening 720 must be provided in the single piece sector reflector.)

If the viewer position 760a is rotated about the center 780 of the opening to the position shown as 760b, the viewing line 750a is correspondingly rotated to the position shown as 750b. In order to view the "virtual" image in the opening 790 from this position (760b) it is necessary to rotate the "sector" reflectors 710c and 710d to the positions shown in dashed lines as 710c' and 710d'. (Assuming that the "sector" reflectors 710c and 710d are attached to the ring 790, the ring 790 rotates with the reflectors 710c and 710d).

This "sector" arrangement is particularly advantageous where a very large image translation chamber is needed, or where weight and portability are important, since considerably less material (and consequently considerably less polished surface area) is required.

Figure 8A:
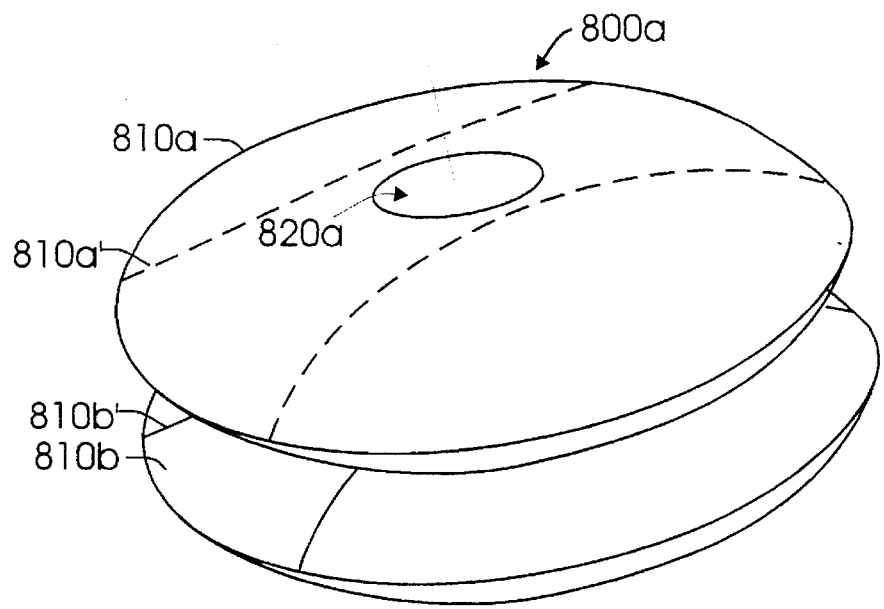
FIG. 8a is a view of a pair of "stacked" image translation chambers, according to the invention.

It will be readily appreciated by one of ordinary skill in the art that two or more image translation chambers can be "stacked" in a co-axial fashion to provide a double translation of the image. Such an arrangement is depicted in FIG. 8a. A stacked image translation arrangement 800a comprises a first image translation chamber 810a disposed above a second image translation chamber 810b in a co-axially aligned configuration. Each of the image translation chambers 810a and 810b is similar to the image translation chamber described hereinabove with respect to FIG. 7a, and operates in the same manner. A "real" image formed at or immediately above the lower reflector of the lower image translation chamber 810b will appear above the viewing opening 820a in the upper image translation chamber 810a.

One of ordinary skill in the art will recognize that if a single viewpoint is to be used, then either one or both of the image translation chambers can be formed in a restricted "sector" format, similar to that described hereinabove with respect to FIG. 7b. This is illustrated in FIG. 8a by outlines 810a' and 810b' of "sector" image translation chambers which can be substituted for the "solid" image translation chambers 810a and 710b, respectively. Evidently, the "sector" image translation chambers 810a' and/or 810b' if employed must be aligned along the viewing path.

It will be evident to one of ordinary skill in the art that since "stacked" arrangements of image translation chambers involve more internal reflections (four per chamber), that in stacked arrangements, surface tolerances, finish requirements, parabolic conformance, and reflector positions are considerably more critical than for a single image translation chamber.

Evidently, a bi-convex lens can be used in much the same fashion as an image translation chamber, since its (parabolic or spherical approximations to parabolic) surfaces are similar to those of an image translation chamber. This is particularly true where coherent light (e.g., from a laser or optical parametric oscillator (OPO)) is used to form an image, since internal reflections will occur within the lens. These internal reflections occur off of the concave inner contours of the convex outer surfaces of the lens. Accordingly, a bi-convex lens can be "stacked" below an image translation chamber to alter the apparent position of a three-dimensional image within the image translation chamber.

Figure 8B:
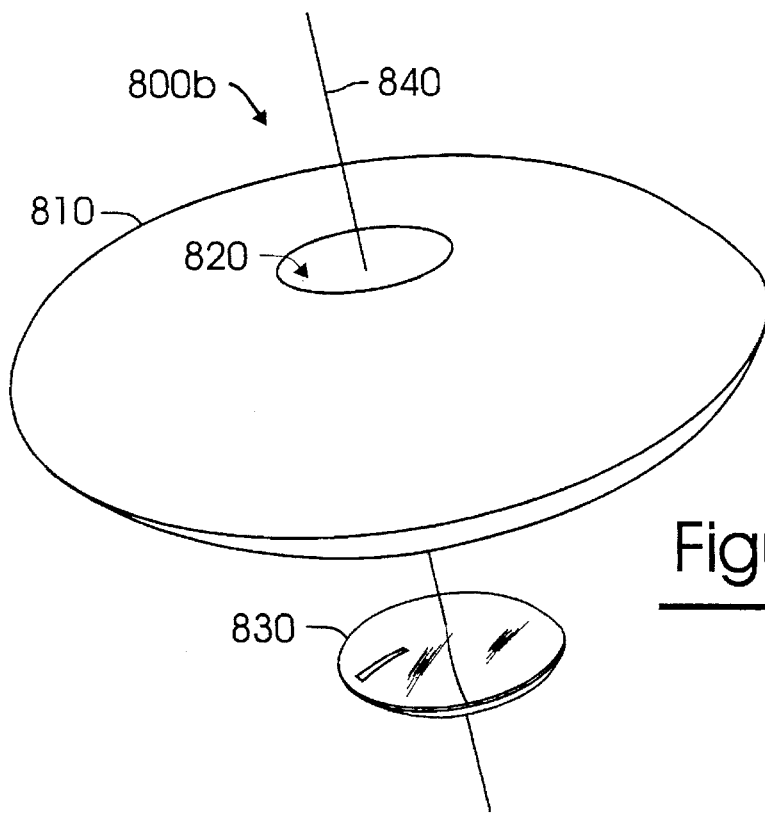
FIG. 8b is an "exploded" view of a stacked assembly of a bi-convex lens and an image translation chamber, according to the invention.

An arrangement 800b of this type is shown in FIG. 8b. An image translation chamber 810 is disposed above a bi-convex lens 830 in a co-axially aligned arrangement about a common axis 840. (The lens 830 is shown spaced away from the image translation chamber 810 in an "exploded" view for illustrative clarity. In actuality, the lens 830 would most likely be positioned close to or in contact with a lower opening of the image translation chamber 810.) An image formed via the lens 830 will appear at the viewing opening 820 in the image translation chamber. As with the stacked image translation chamber arrangement of FIG. 8a, optical tolerances are considerably more critical in the stacked arrangement 800b, due to the greater number of reflections as compared to a single image translation chamber. Also, as with the stacked arrangement of FIG. 8a, either the image translation chamber 810, the bi-convex lens 830, or both can be formed in a "sector" configuration (see FIG. 7b) aligned along a viewing path.

The "sector" arrangement described with respect to FIG. 7b is suited only to a single viewer or viewing position. Often, however, it is not possible to limit a viewer to a small range or viewing angles or to limit viewability to a single viewer. In these cases, the arrangement of FIG. 7b suffers considerably. The following discussion with respect to FIG. 8c addresses this deficiency in the "sector" reflector arrangements.

FIG. 8c is an oblique view of a rotating "sector" image translation chamber 845. The image translation chamber, similar to that shown and described with respect to FIG. 7b, comprises two co-axially aligned support rings 855a and 855b, and four convex reflector sections 850a, 850b, 850c, and 805d, attached to the rings 855a and 855b. The support ring 855b is shaped to act as a pulley, around which a drive band or belt 860 is disposed. The support rings 855a and 855b also define the lower and upper openings (apertures) of the image translation chamber 845. Two of the convex reflector sections 850a and 850b are arranged to one side of the rings 855a and 855b, and the other two convex reflector sections 850c and 850d are arranged diametrically opposite (with respect to the rings 855a and 855b) the first two convex reflector sections 855a and 855b. The drive band or belt 860 goes around a drive pulley 865 driven by a drive motor 870. By energizing the drive motor, the "sector" image translation chamber 845 can be rotated about its vertical axis (the axis through the centers of the rings 855a and 855b).

If there is a single viewer, then the motor can be used to align the chamber 845 with the viewer's position. This can be accomplished by sensing the viewer's position and driving the chamber 845 with the motor 870 so that the viewing axis of the chamber 845 follows the viewer's position. This is described in greater detail hereinbelow with respect to FIG. 8e. If, however, a wide range of viewing angles must be accommodated simultaneously, then it is possible to spin the chamber 845 rapidly to permit all viewing angles to be accommodated. It is important to realize, however, that since this arrangement makes use of the image persistence characteristics of the viewer's eye, that image brightness and contrast may be degraded somewhat. This can be compensated for by increasing the brightness (and contrast) of the "real" image. It will be evident to one of ordinary skill in the art that any suitable drive mechanism can be substituted for the belt and pulley arrangement shown in FIG. 8c.

The quality of the virtual image formed by an image translation chamber is greatly affected by the parabolic conformance of its concave reflecting surfaces. Unfortunately, however, true parabolic surfaces are difficult to produce. A rotating "sector" reflector arrangement (e.g., FIG. 8b) can be used to great advantage in providing a "true" parabolic reflector shape while simultaneously avoiding the need for manufacturing a parabolic reflector. This is described with respect to FIG. 8d.

FIG. 8d is a side view of a "sector" image translation chamber formed from an upper concave reflector portion 852a and a lower concave reflector portion 852b. The two reflector portions 852a and 852b are joined by flexible attachments 854, which act as pivots between the two reflector portions 852a and 852b. The pivots are formed in a non-parabolic shape of a flexible material (e.g., a spring steel or other "springy" material). The nonparabolic shape reflector portions 852a and 852b is preferably a spherical shape or other suitable easy-to-form shape. When the "sector" image translation chamber is spun, centrifugal force causes the assembly to "spread" into the shape shown generally as 856 (dashed lines). Assuming a spherical initial shape, suitably flexible "pivots" (854), and appropriate rotational speed, the new shape (856) is parabolic. If desired, the "pivots" 854 can be weighted to help control the forces applied to the concave reflector portions 852a and 852b.

FIG. 8e is a block diagram of a position control system for a "sector" image translation chamber. In this case, the image translation chamber 845 of FIG. 8c is considered. An observer 885 wishes to view a three dimensional image via the image translation chamber 845. An observer position sensor 880 determines the observer's angular position relative to the vertical axis of the chamber 845. This position information is applied to a servo control system 875 which drives the motor 870 to bring the image acceleration chamber 845 into alignment with the observer's viewing position. As the observer moves about the image, the "sector" image translation chamber is continually rotationally aligned with the observer's position. It will be readily appreciated by one of ordinary skill in the art that this arrangement is well suited to viewing by a single observer or to viewing by two observers opposite one another.

The discussion hereinabove with respect to FIGS. 7a, 7b and 8a–e has been directed to techniques of image translation whereby a "real" image is perceived by a viewer as a "virtual" image at a different location. These techniques manipulate three-dimensional images which have already been created. Attention is now directed to techniques aimed at generating images, including color images.

Figure 9:
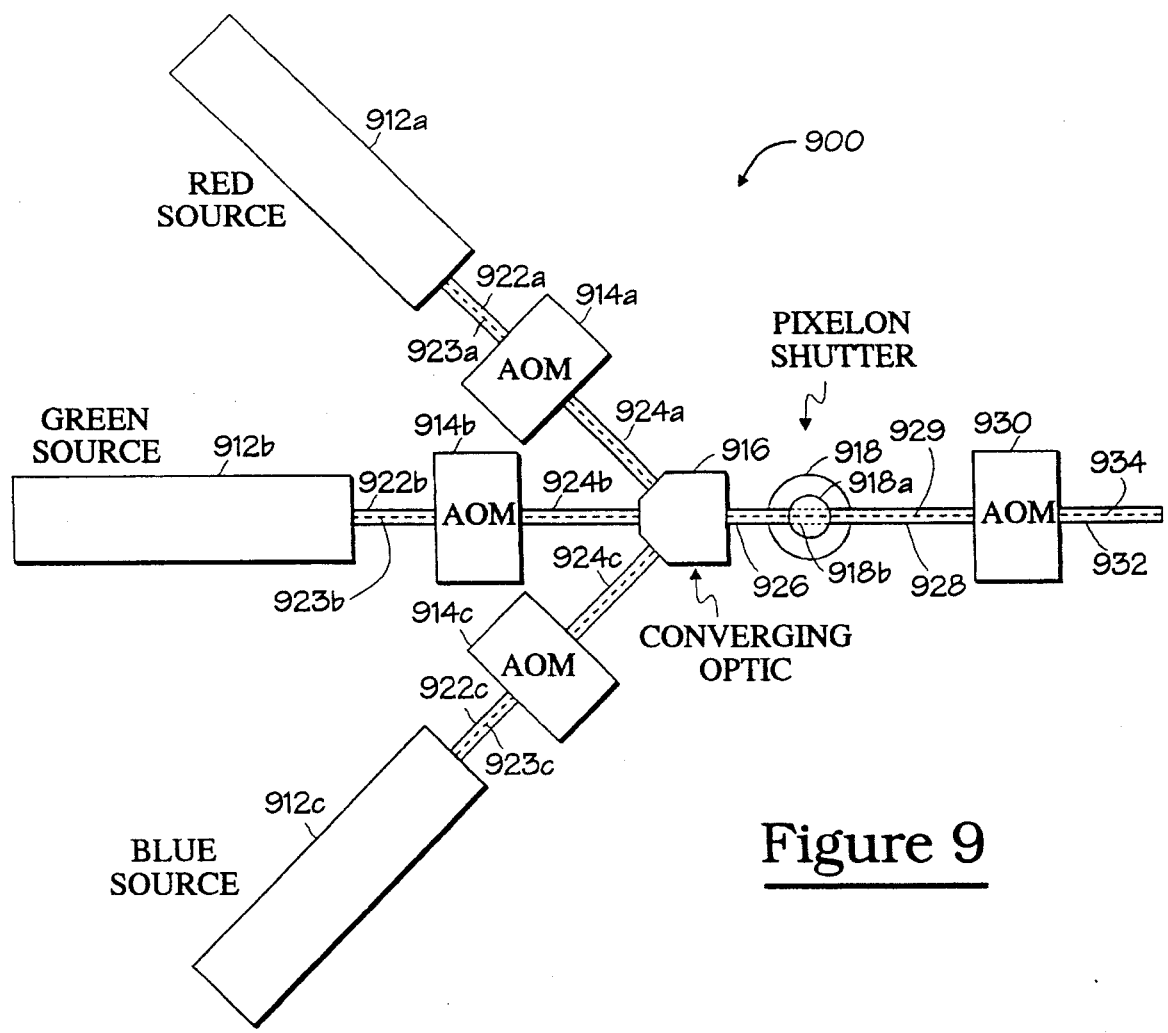
FIG. 9 is a diagram (top view) of apparatus for controlling color, intensity and modulation of a laser light beam, according to the invention.

In order to generate a color three-dimensional image, it is necessary to provide a coherent light source which can be modulated in both color and intensity. FIG. 9 is a block diagram of apparatus for accomplishing this.

FIG. 9 is a block diagram of a color controllable, intensity modulated laser light source 900. A red laser 912a, a green laser 912b and a blue laser 912c, provide monochromatic, coherent, collimated beams of light in each of the three primary colors of light. (It will be evident to ordinary skill in the art that the term "laser" is used loosely here, and encompasses all methods of generating collimated coherent light, including OPO's or Optical Parametric Oscillators). The red laser 912a generates a coherent red light beam 922a, directed along a path 923a. The green laser 912b generates a coherent green light beam 922b, directed along a path 923b. The blue laser generates a coherent blue light beam 922c, directed along a path 923c. A first AOM 914a (Acousto-Optic Modulator or Audio Optic Modulator) receives the red light beam 922a and modulates it in intensity, producing an intensity modulated red light beam 924a. A second AOM 914b receives the green light beam 922b and modulates it in intensity, producing an intensity modulated green light beam 924b. A third AOM 914b receives the blue light beam 922c and modulates it in intensity, producing an intensity modulated blue light beam 924c. It will be understood by one of ordinary skill in the art that the three AOMs 914a, 914b, and 914c can be controlled with suitable drive electronics to provide very fine control (e.g., 8-bit or 256-level control) over beam intensity. If, for example, 8-bit control is provided over each of the three color modulated beams 924a, 924b, and 924c, then 16,777,216 color/intensity combinations are possible. A converging optical assembly 916, receives the three intensity modulated color beams 924a (red), 924b (green) and 924c (blue), and merges them into a common, color-modulated beam 926. The color and intensity of the color-modulated beam 926 is controlled by manipulating the intensities of the three component color beams 924a, 924b, and 924c, using the first, second and third AOM's, 914a, 914b, and 914c, respectively.

The color-modulated beam is then passed through a Pixelon (TM) shutter 918 which permits high-speed gating of the color modulated beam 926 to produce a gated color-modulated beam 928 directed along a path 929. The Pixelon (TM) shutter (described hereinabove with respect to FIG. 2) comprises a drive motor 918a and a gate 918b. The gate is essentially a cylindrical rod through which one or more diametric holes are formed. When a hole is in alignment with the incident beam (e.g., 926), the beam passes through the hole. When the hole is not in alignment with the beam, the beam is blocked. The position of the rod is controlled by the motor 918a. By rapidly controlling the alignment of the hole (or holes) with the incident beam, the incident beam can be rapidly gated.

The gated color modulated beam 928 is then modulated by a fourth AOM 930 to provide a Z-axis modulated beam 932, directed along a path 934. It will be readily appreciated by one of ordinary skill in the art that AOMs can be used in conjunction with extremely high-frequency modulating waveforms to provide extremely high-speed control of the intensity of the incident beam. This high-speed control can be used to provide a repeating pattern of "packets" of light. By adjusting the repetition period of the modulation pattern on the beam 932 to coincide with a reflection interval in interferometric apparatus, Z-axis (depth) control of an image can be achieved, as described in greater detail hereinbelow.

Although the apparatus 900 described above uses three lasers 912a, 912b, and 912c to produce the three primary colors of light, it will be readily understood by one of ordinary skill in the art that any number of light sources (e.g., one light source in monochromatic applications) is readily accommodated by this technique.

The discussion hereinabove with respect to FIG. 2 was directed to a Pixelon (TM) shutter with a single hole. FIG. is a view of a Pixelon (TM) shutter 1000 with a plurality of diametric holes (four, in this case). The shutter consists of a cylindrical rod 1010 with straight sides 1012, through which a plurality of diametric holes are formed. A first opening 1020a is formed in the side wall 1012 by a first hole which extends through the rod, exiting at a diametrically opposite location 1020b. Three other openings 1022a, 1024a, and 1026a, corresponding to three other holes extend into the side 1012 of the rod 1010, exiting at a diametrically opposite position (not shown).

It is possible to form the holes directly into a motor shaft, using the motor shaft itself as the cylindrical shutter rod 1010. This provides for extremely low-mass and rotational inertia (even lower than that of the original motor shaft), thereby allowing very rapid rotation and/or positioning of the shaft. The shutter can be spun rapidly to provide high-speed periodic gating of the incident beam (e.g., using a high-speed DC motor) or selectively controlled as described hereinabove with respect to FIG. 2. By providing more holes in the rod 1010, higher-speed gating of the beam is possible.

Figure 10A:
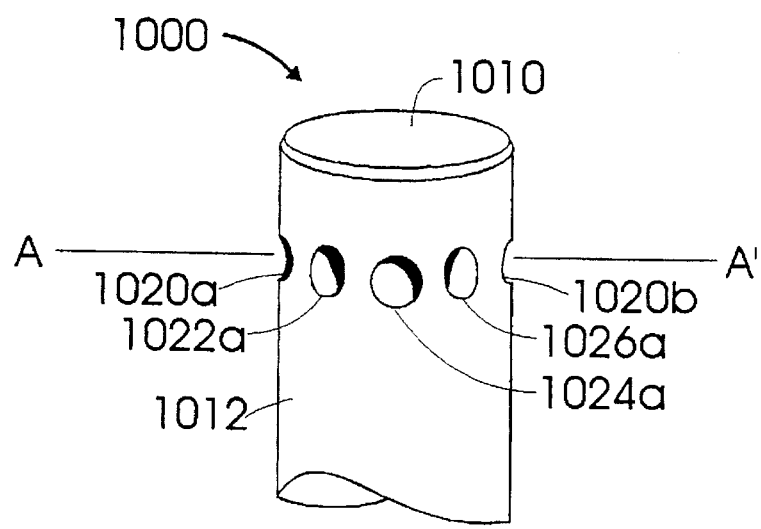
FIGS. 10a and 10b are views of a multi-aperture shutter, according to the invention.
Figure 10B:
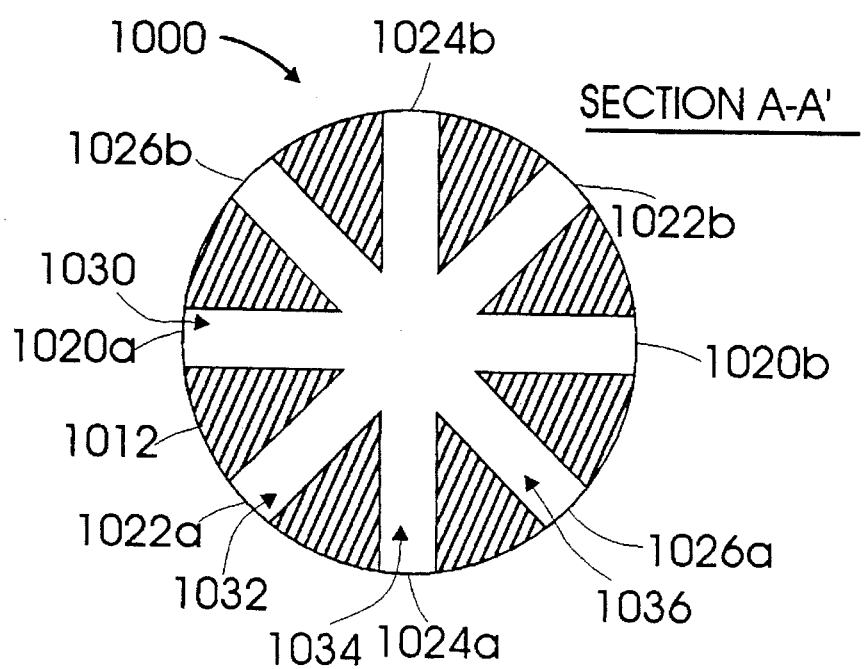

FIG. 10b is a cross-sectional view of the Pixelon (TM) shutter 1000 viewed from the top (i.e., looking along the length of the rod) through section line A–A'. The four holes 1030, 1032, 1034 and 1036 can be seen extending along four evenly (radially) space diameters of the rod. The hole 1030 forms two diametrically opposite openings 1020a and 1020b in the side wall 1012 of the rod. The hole 1032 forms two diametrically opposite openings 1022a and 1022b in the side wall 1012 of the rod. The hole 1034 forms two diametrically opposite openings 1024a and 1024b in the side wall 1012 of the rod. The hole 1036 forms two diametrically opposite openings 1026a and 1026b in the side wall 1012 of the rod.

In order to limit or prevent unwanted reflections from the Pixelon (TM) shutter rod 1010, the rod 1010 can be provided with a non-reflecting (e.g., matte) surface finish, such as by anodizing an aluminum rod.

Having developed a modulated beam, it is next necessary to address the issue of formation of a viewable image from that beam. Rotating screen techniques such as that described in BATCHKO can make use of a color-modulated beam (e.g., 926, 928, or 932, FIG. 9) to form a color image. Such techniques aim the beam at a rotating screen to form a small spot thereupon. Deflection of the beam and the rotational motion of the screen combine in a form of "scanning" to trace a three-dimensional image in space. Such techniques require only highly collimated light, as opposed to the fully coherent light provided by lasers. Since there is no interferometry, non-coherent light sources can be used as well. Image persistence in the viewer's eye provides image cohesion. Such rotating screen techniques, however, often have problems associated with illumination intensity, addressability, and form factor. Other techniques for forming three-dimensional images are described hereinbelow with respect to FIGS. 11a–18.

Figure 11A:
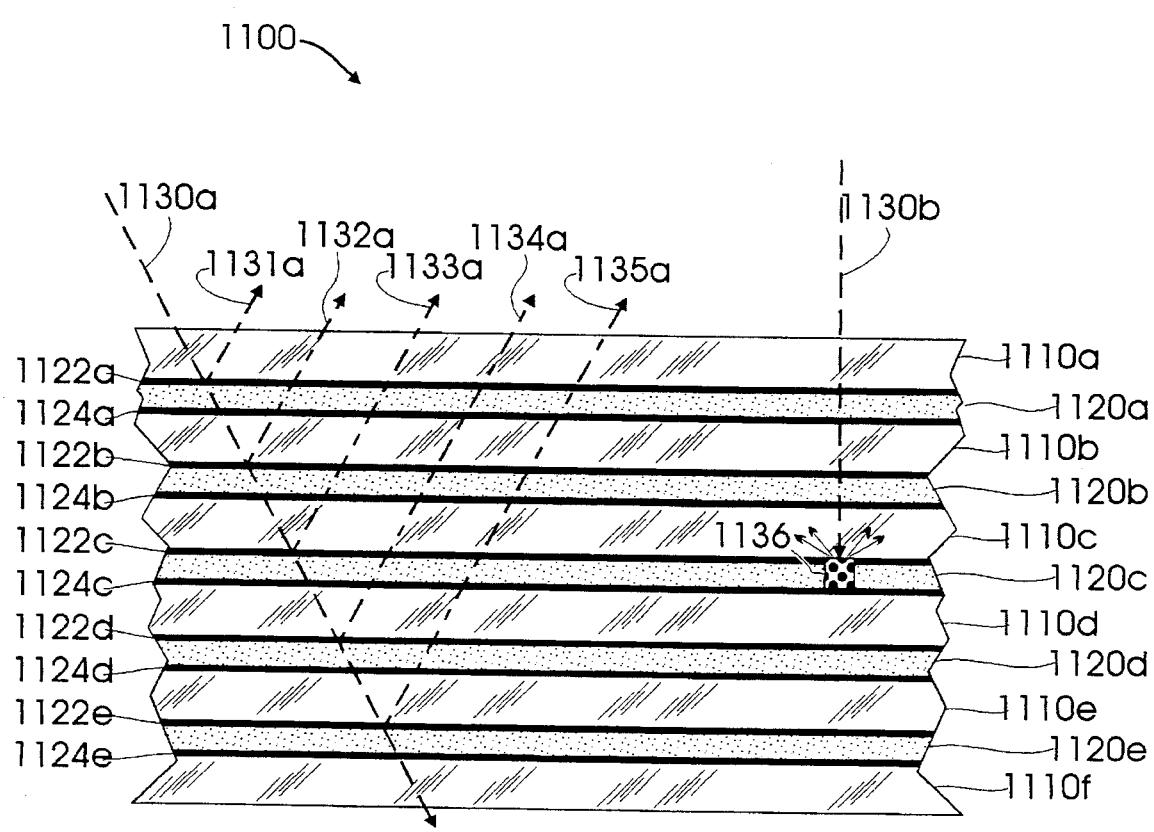
FIG. 11a is a cross-sectional view of an active multi-planar optical element, according to the invention.

FIG. 11a is a view of an active multi-planar optical element (MPOE) 1100 used in forming images, according to the invention. The multi-planar optical element 1100 comprises a series of transparent (preferably glass) plates 1110a, 1110b, 1110c, 1110d, 1110e, and 1110f, separated from one another by monolithic liquid crystal layers 1120a, 1120b, 1120c, 1120d, and 1120e. Each liquid crystal layer is provided with a pair of transparent electrodes for the purpose of "activating" the liquid crystal material. Liquid crystal layer 1120a has transparent electrodes 1122a and 1124a disposed on opposite sides thereof. Liquid crystal layer 1120b has transparent electrodes 1122b and 1124b disposed on opposite sides thereof. Liquid crystal layer 1120c has transparent electrodes 1122c and 1124c disposed on opposite sides thereof. Liquid crystal layer 1120d has transparent electrodes 1122d and 1124d disposed on opposite sides thereof. Liquid crystal layer 1120e has transparent electrodes 1122d and 1124e disposed on opposite sides thereof.

It is known in the art to electrically control liquid crystal assemblies to switch between a light transmissive state and a reflective state. It is also known to similarly control liquid crystal materials to switch between a light-transmissive (transparent) state and an opaque state. This is accomplished by applying an electrical potential across a pair of electrodes between which liquid crystal material is disposed. The electrical potential causes the molecules of the liquid crystals to "align" into a common orientation, giving the liquid crystal material certain electrically controllable electrical properties. The behavior of liquid crystals is well understood in the art and will not be further elaborated upon herein.

The active multi-planar optical element 1100 has two primary "modes" of operation. In a first "reflective" mode of operation, the active multi-planar optical element acts as an electrically controllable selectively reflective device. This is illustrated in FIG. 11a by the behavior of an incident light beam 1130a. The light from the beam 1130a is either reflected or transmitted based upon the state of the liquid material through which it passes. Accordingly, if the topmost liquid crystal layer 1120a is in a reflective state, then the incident beam 1130a is "bounced" off of the liquid crystal layer 1120a as a reflected beam 1131a. If the topmost liquid crystal layer 1120a is in a transmissive state and the next lower liquid layer 1120b is in a reflective state then the incident beam 1130 is transmitted by the topmost liquid crystal layer 1120a without substantial reflection and bounced off of the liquid crystal layer 1120b as a reflected beam 1132a. If the topmost two liquid crystal layers 1120a and 1120b are in a transmissive state and the next lower liquid layer 1120c is in a reflective state then the incident beam 1130 is transmitted by the topmost two liquid crystal layers 1120a and 1120b without substantial reflection and bounced off of the liquid crystal layer 1120c as a reflected beam 1133a. If the topmost three liquid crystal layers 1120a, 1120b, and 1120c are in a transmissive state and the next lower liquid layer 1120d is in a reflective state then the incident beam 1130 is transmitted by the topmost three liquid crystal layers 1120a, 1120b, and 1120c without substantial reflection and bounced off of the liquid crystal layer 1120d as a reflected beam 1134a. If the topmost four liquid crystal layers 1120a, 1120b, 1120c, and 1120d are in a transmissive state and the next lower liquid layer 1120e is in a reflective state then the incident beam 1130 is transmitted by the topmost four liquid crystal layers 1120a without substantial reflection and bounced off of the liquid crystal layer 1120b as a reflected beam 1135a. The various reflected beams (1131a–1135a) are spaced apart from one another by a distance determined by the spacing between the liquid crystal layers (1120a–e) and the angle of incidence of the incident beam 1130a.

By selectively controlling the transmissive/reflective states of the various liquid layers, the active multi-planar optical element can be used to cause an incident beam to produce a number of "scanned" reflected beams in sequence. This beam "scanning" can be used in a manner similar to the well-known technique of "galvo" scanning (wherein a mirror mounted on a shaft of a galvanometer is rotated or vibrated to control a beam deflection angle or to generate a beam sweep pattern; two such "galvo" scanned mirrors can be used to accomplish scanning in two dimensions). Anti-reflective coatings on the transparent layers 1110a–e can be used to minimize "ghosting" and undesirable spurious reflections off the surfaces thereof. An advantage of active multi-planar optical element scanning is that all of the reflected beams (e.g., 1131a–1135a) are parallel, as opposed to the divergent beams resulting from galvo scanning.

The second "mode" of operation of this active multi-planar optical element 1100 is an opaque "imaging" mode. In this mode, a liquid crystal layer (e.g., 1120a–e) is made opaque. Wherever an incident light beam strikes the opaque layer, a spot of light is formed. This is illustrated in FIG. 11a. In this case the first two liquid crystal layers 1120a and 1120b are transparent and the third liquid crystal layer 1120c is made opaque (by controlling the transparent electrodes). An incident beam 1130b, aimed perpendicular to the surface of the active multi-planar optical element passes through the transparent liquid crystal layers 1120a and 1120b and strikes the opaque layer 1120c, forming a spot of light 1136. This spot 1136 is visible to an observer through the transparent layer. If the incident beam 1130b is scanned in a pattern over the multi-planar optical element, the spot 1136 on the opaque layer 1120c traces the path of the beam 1130b, thereby forming an image on the opaque liquid crystal layer 1130c which is visible to an observer. By rapidly scanning images in sequence over each of the liquid crystal layers 1120a–e, each layer 1120a–c made opaque in a repeating sequence, a three-dimensional image is formed within the active multi-planar optical element. As each liquid crystal layer (1120a–e) is made opaque in turn, the image traced on it by the incident beam 1130b can be seen by an observer through the other transparent layers. As before, anti-reflective coatings can be used to minimize "ghosting" and spurious reflections.

One of ordinary skill in the art will understand that the active multi-planar optical element is not restricted to any particular number of layers, and that any number of liquid layers may readily be incorporated into an assembly of this sort. By providing a large number layers, three-dimensional images of considerable depth can be formed. Alternatively, with a large number of layers an incident beam can be effectively "scanned" in a large number of steps.

Figure 11B:
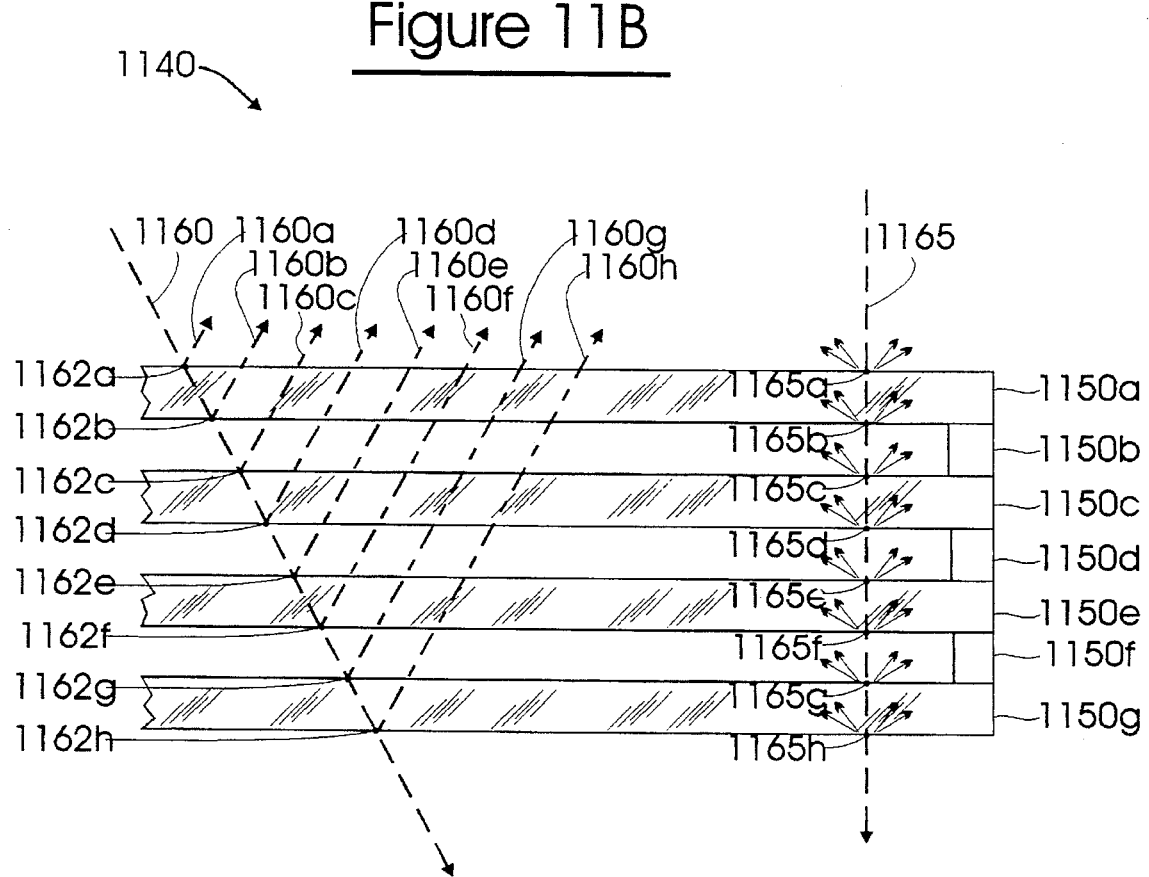
FIG. 11b is a cross-sectional view of a passive multi-planar optical element, according to the invention.
Figure 12:
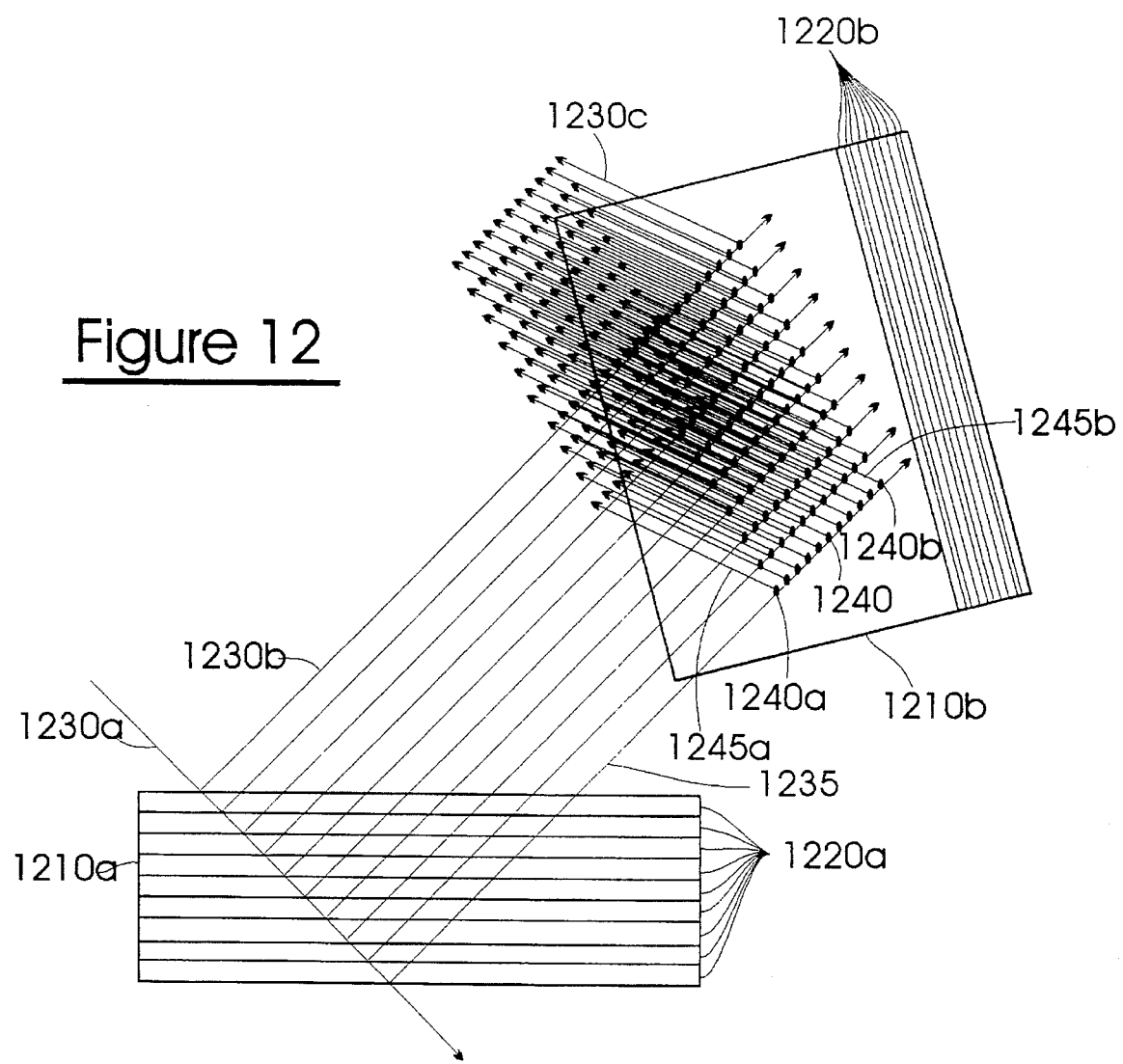
FIG. 12 is a view illustrating the use of two multi-planar optical elements to produce a two-dimensional rectangular array of light beams from a single incident beam, according to the invention.

FIG. 11b shows a "passive" multi-planar optical element 1140, comprising a plurality of spaced-apart planar transparent (preferably glass) layers 1150a, 1150c, 1150e, and 1150g, each layer having two parallel planar surfaces. Constant spacing between the transparent layers 1150a, 1150c, 1150e and 1150g is maintained by spacers 1150b, 1150d, and 1150f (preferably transparent). (Four layers and three spacers are shown. It will be understood by one of ordinary skill in the art that any number of layers may be similarly accommodated.) Unlike the active multi-planar optical element 1100 (FIG. 11a) the passive multi-planar optical array 1140 is a completely passive optical device, having no electrical (or other) connections.

Like the active multi-planar optical element, the passive multi-planar optical element 1140 has two "modes" of use: a "reflective" mode and an "image" mode. Both modes are illustrated in FIG. 11b. In the "reflective" mode, an incident beam of light 1160 is directed into the multi-planar optical element 1140 at an oblique angle. Each surface of each transparent layer (1150a,c,e, and g) acts as a reflecting surface, since at each surface there is a change of refractive coefficient (e.g., glass to air). As the beam 1160 penetrates the transparent layers, a portion of the light energy in the beam is reflected off of each surface, forming reflected beams 1160a, 1160b, 1160c, 1160d, 1160e, 1160f, 1160g, and 1160h. The reflected beams are all parallel to one another.

If a rapidly modulated light source is used, then the reflected beams differ from one another in time. The first reflected beams are advanced in modulation "phase" relative to later modulated beams. This "phase" relationship can be used to advantage in interferometric applications.

In a second "image forming" mode of usage, the passive multi-planar optical element 1140 can be employed to form a plurality of visible image "dots". This is illustrated in FIG. 11b by the response of the multi-planar optical element 1140 to a perpendicular incident beam 1165. The beam 1165 passes through the layers 1150a, 1150c, 1150e and 1150g of the transparent multi-planar optical array 1140, forming a visible "dot" at each change of refractive index (i.e., at each surface of each transparent layer where there is a gas to transparent medium, e.g., glass to air, transition). In conjunction with very high speed modulation and reflective reinforcement (as described hereinbelow with respect to FIGS. 14a,b and 15), the intensity of individual dots can be controlled. In conjunction with further scanning (in the two dimensions perpendicular to the beam 1165), visible images can be formed on each of the surfaces of each of the transparent layers, thereby creating a visible three-dimensional image inside the multi-planar optical array which can be viewed by an observer.

Since a single multi-planar optical element can be used to generate a plurality of (preferably evenly spaced) first parallel reflected beams from a single incident beam, it follows that a rectangular array of second parallel reflected beams can be generated from the plurality of first parallel reflected beams by using a second appropriately positioned multi-planar optical element. This is illustrated and described with respect to FIG. 12.

A first multi-planar optical element 1210a having a plurality of reflecting layers (e.g. 1100 of FIG. 11a, or 1140 of FIG. 11b) is used to split an incident beam 1230a into a plurality of first parallel reflected beams 1230b. A second multi-planar optical element 1210b having a plurality of reflecting layers 1220b is positioned such that each of the first parallel reflected beams 1230b strikes its surface at an oblique angle. Each first parallel reflected beam 1230b is further "split" into a plurality of second parallel reflected beams 1230c, resulting in a rectangular array of second parallel reflected beams 1230c. Each second parallel reflected beam 1230c originates at a reflecting point 1240 where its respective first reflected beam 1230b crosses a reflecting surface in the second multi-planar optical element 1210b. To further illustrate the effect of the various reflecting layers 1220b in the second multi-planar optical element 1210b, several reflected beams are specifically indicated.

Following the path of one of the first parallel reflected beams 1235 (the lower-most beams 1230b as illustrated), the beam 1235 intercepts a first reflecting layer of the second multi-planar optical element 1210b at a reflecting point 1240a. A portion of the energy in the first parallel reflected beam 1235 is reflected from this reflecting point 1240a to form a reflected beam 1245a. As the beam traverses each reflecting surface 1220b in the second multi-planar optical element 1210b, another reflected beam is generated until the first parallel incident beam passes through the last reflecting layer at a reflecting point 1240b, generating a corresponding last reflected beam 1240b. Reflecting characteristics of the reflecting layers 1220a and 1220b can be controlled to provide uniform reflected beam intensity.

Figure 13:
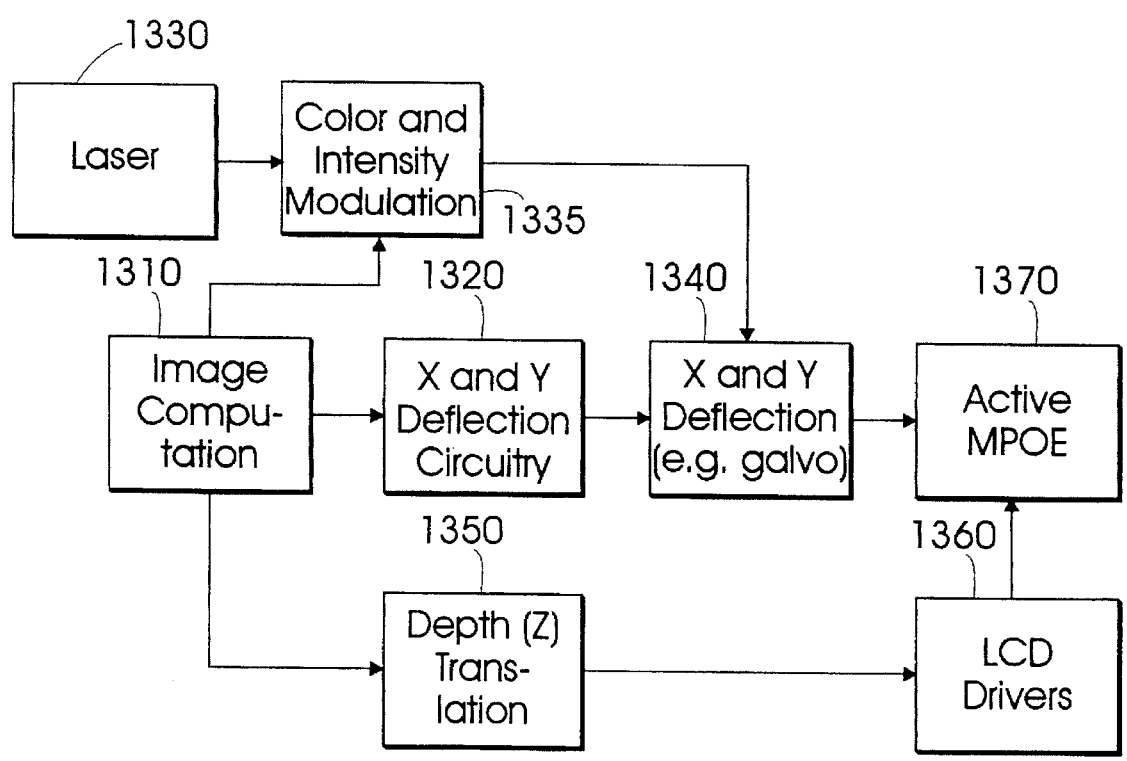
FIG. 13 is a block diagram of apparatus for generating a three dimensional viewable image using an active multi-planar optical element for imaging, according to the invention.

FIG. 13 is a block diagram of three-dimensional image generation apparatus which uses an active multi-planar optical element in an "imaging" mode to form a visible three dimensional image. A first block 1310 represents a computer or other image computation apparatus where the size, position, orientation, color, three-dimensional (e.g., X, Y, Z) image point coordinates, etc., of a three-dimensional image to be generated are determined. A laser 1330 (combination of color lasers for color applications) generates a continuous source beam. According to the image data generated in the image computation block 1310, a color and intensity modulation block 1335 modulates the intensity (and color in multi-color applications) of the source beam to produce a modulated beam. (Blocks 1330 and 1335 in combination are comparable to the apparatus depicted in FIG. 9.) The modulated beam is deflected in two dimensions (X and Y) by X and Y deflection apparatus 1340, such as a pair of galvo-controlled mirrors. The X and Y deflection apparatus 1340 is controlled by X and Y deflection circuitry 1320 which operates according to computed deflection parameters derived from X and Y image data from the image computation block 1310. Depth data from the image computation block 1310 is translated into specific Z-coordinates in a depth translation block 1350. The resulting Z-coordinate (depth data) is used to control LCD drivers 1360 to operate liquid crystal layers in an active MPOE (multi-planar optical element). The X and Y deflected beam resulting from X and Y deflection (ref 1340) of the modulated beam (from 1335) impinges upon the activated (opaque) selected layer of the active MPOE 1370 to create a visible image thereupon. As the various layers of the active MPOE 1370 are individually activated and "imaged" with the modulated beam (from 1335) a three-dimensional image appears within the active MPOE 1370.

As an alternative to galvanometer scanning, AOBD's (Acousto-Optic Beam Deflectors) can be used to cause electrically controllable deflection of a beam of light. AOBD's are essentially acousto-optic devices adapted specifically for beam deflection. Such devices are known in the art.

The image generation (formation) techniques described hereinabove with respect to FIGS. 11a, 11b, 12 and 13 make use of multi-layer transparent assemblies. Another approach to forming three-dimensional image makes use of the ability to cause gas molecules to emit light when stimulated with photon energy.

Figure 14A:
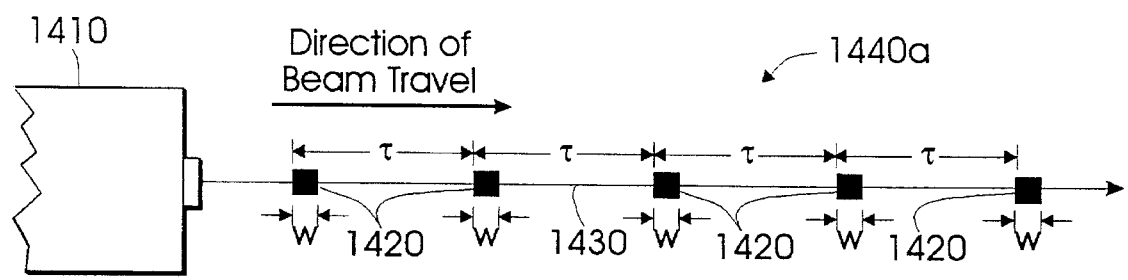
FIGS. 14a and 14b illustrate high-speed periodic pulse modulation of a light beam, according to the invention.

FIG. 14a is a diagram illustrating high speed modulation of a light beam. Beam generation apparatus 1410 (see, e.g., FIG. 9) is used to generate a modulated beam of coherent light 1440a. The beam is modulated (e.g., with AOM's, see FIG. 9) to produce a plurality of evenly-spaced (in time) "packets" of light 1420. (That is, the beam is gated on and off such that evenly-timed pulses of light are generated.) The beam travels in the direction indicated (to the right in the FIG., as indicated by the arrow pointing to the right) at the speed of light. As a result, the evenly-timed "packets" 1420 of light are also evenly-distanced from one another (in space) along the path of the beam. Each packet 1420 (pulse) has a duration "w", and the packets 1420 (pulses) are emitted with a repetition period "$\tau$". The actual distance (in space) between the starting points of adjacent packets 1420 (pulses) is the distance traveled at the speed of light (roughly one nanosecond per foot) in a time interval "$\tau$". For example, if one packet 1420 (pulses) is emitted every 0.25 nanoseconds, then the pulses will be spaced approximately 3 inches apart along the path of the beam 1440a. The length of each packet 1420 (along the path of the beam 1440a) is equal to the distance traveled at the speed of light over a time interval "w".

Figure 14B:
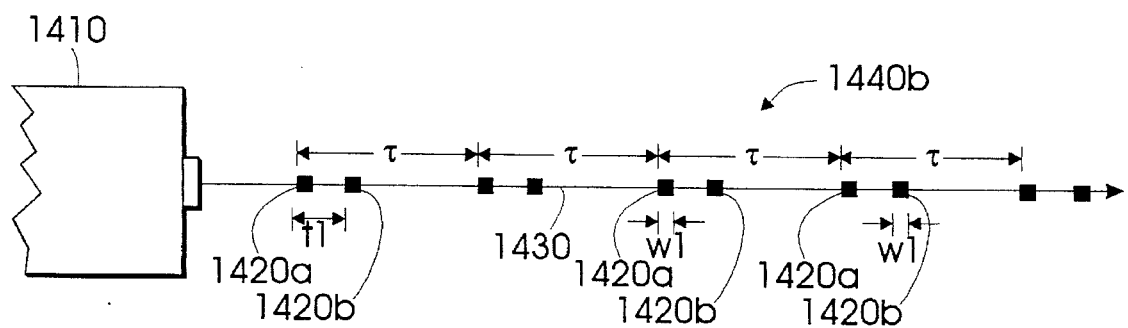

FIG. 14b is identical to FIG. 14a, except that a different modulated beam 1440b is generated. In this case, two pulses 1420a and 1420b are emitted during each time interval "$\tau$". Each pulse (1420a,b) has a duration "w1". The second pulse 1420b of each pair of pulses (1420a,b) is emitted a time interval "t1" after the first pulse 1420a is emitted. This results in the time (and distance) spacing of pulses shown in the Figure.

Figure 15:
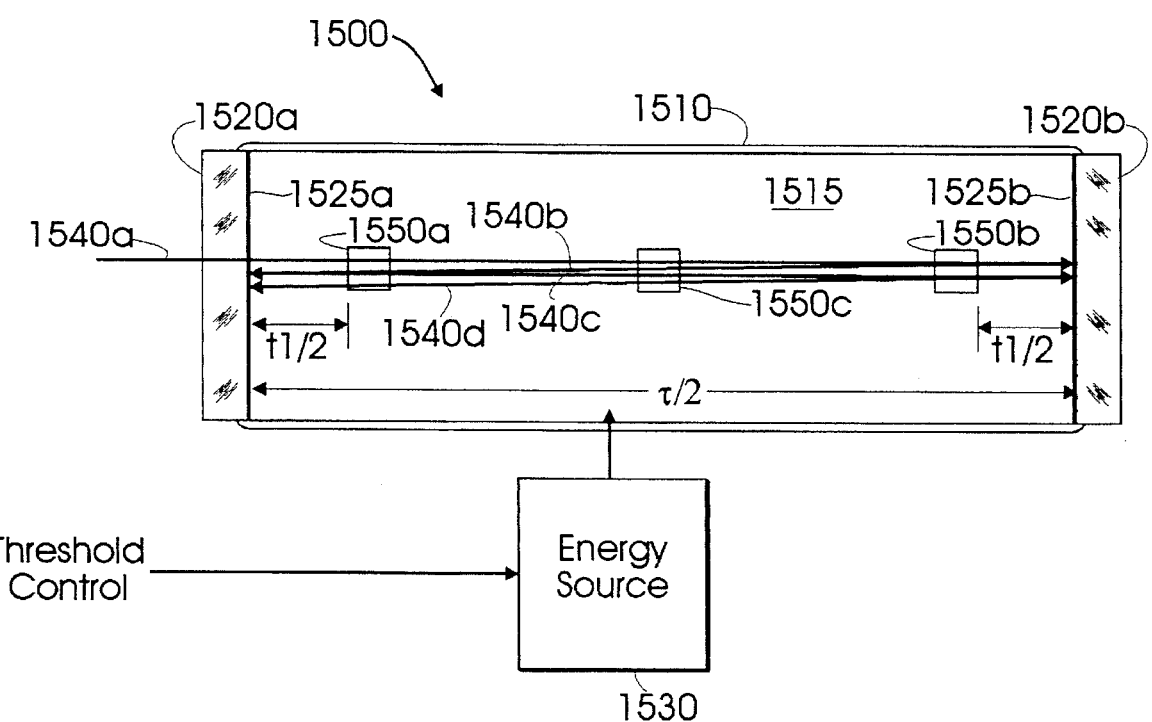
FIG. 15 is a cross-sectional view of a gaseous imaging chamber, according to the invention.

FIG. 15 is a view of a gas imaging chamber 1500, suited to processing a modulated beam 1540a (see, e.g., 1440a and 1440b of FIGS. 14a and 14b, respectively) to produce a visible image. The imaging chamber 1500 is formed inside a transparent outer shell 1510, including transparent ends 1520a, 1520b. The shell is filled with an imaging gas 1515 (preferably an inert gas, e.g., helium, neon, argon, xenon, etc.). Two parallel front-surface mirror finishes 1525a and 1525b are provided on the inside surfaces of the transparent ends 1520a and 1520b, respectively. One of the mirror finishes 1525a is of the partially transmissive type, permitting a light beam to enter the imaging chamber therethrough. The distance between the mirror finishes 1525a and 1525b is one half the distance traveled by a beam of light in the imaging gas over a time interval "$\tau$". The time interval "$\tau$" corresponds to the time interval "$\tau$" between (pairs of) light pulses on the modulated beam 1540a (refer to the discussion hereinabove with respect to FIGS. 14a and 14b). The modulated beam enters the chamber 1500 at an angle perpendicular to the partially transmissive mirror finish 1525a. The beam passes through the gaseous medium 1515 and is reflected off of the opposite mirror finish 1525b in a first reflected beam 1540b. This first reflected beam 1540b then passes back through the gaseous medium 1515 and is reflected off of the first mirror finish 1525a in a second reflected beam 1540c. This second reflected beam 1540c passes through the gaseous medium 1515 again, and is once again reflected off of the second mirror finish 1525b in a third reflected beam 1540d, etc. The reflected beams 1540b,c,d are shown diverging slightly only for the purpose of illustrative clarity. In fact, the reflections actually occur back and forth along the same path. Since the beam reflection path within the chamber is exactly one half of the pulse waveform period "$\tau$" on the incident beam, subsequent pulse periods on the incident beam will reinforce one another. The pulses (or packets, as described with respect to FIGS. 14a and b) travel through the gaseous medium at the speed of light in the gaseous medium, but depending upon pulse (packet) spacing, will periodically encounter ("collide" with) and reinforce a reflected pulse on a returning (reflected) beam. If the modulated beam 1540a is modulated as described with respect to FIG. 14a, this reinforcement where forward-travelling and reflected pulses meet will occur only at the mirrored ends (1525a,b) of the imaging chamber where packets are "folded" and meet themselves as they reflect. If, however, the modulated beam is modulated as described with respect to FIG. 14b, this pulse reinforcement will occur at positions indicated generally as 1550a and 1550b. If these reinforced pulses have sufficient energy, the gaseous medium will emit photons of light at the point of reinforcement, causing visible spots at locations 1550a and 1550b. The gaseous medium 1515 can be "biased" with an energy source 1530 (in a manner similar to that used in "pumped" lasers), to reduce the amount of pulse (or packet) energy required to cause photon emission in the gaseous medium. Illuminated spots within the chamber 1500 always occur in complementary pairs, equidistant from the center of the chamber. If the time interval "$\tau 1$" (see FIG. 14b) is exactly one half of "$\tau$", then the pair of spots merge to form a single (possibly double-bright) spot 1500c at the center of the chamber. A threshold control governing the amount of electrical "bias" applied to the imaging gas 1515 can be used to control overall image brightness. Beam modulation intensity can also be used to control brightness.

One of ordinary skill in the art will immediately appreciate that the modulated beam 1540a need not be of a visible light wavelength, since it is only necessary that secondary emissions from the imaging gas 1515 provide visible light. Accordingly, the "mirrored" surfaces 1525a and 1525b can be frequency selective, reflecting only the wavelength of the incident beam and transmitting all other wavelengths of light. It will also be readily understood by one of ordinary skill in the art that FIG. 15 is merely representative of one of many different possible physical configurations for a gaseous imaging chamber and that it is within the spirit and scope of the present invention that the physical configuration of the imaging chamber be altered as necessary to fit within the physical constraints of a three-dimensional (volumetric) imaging application.

Figure 16:
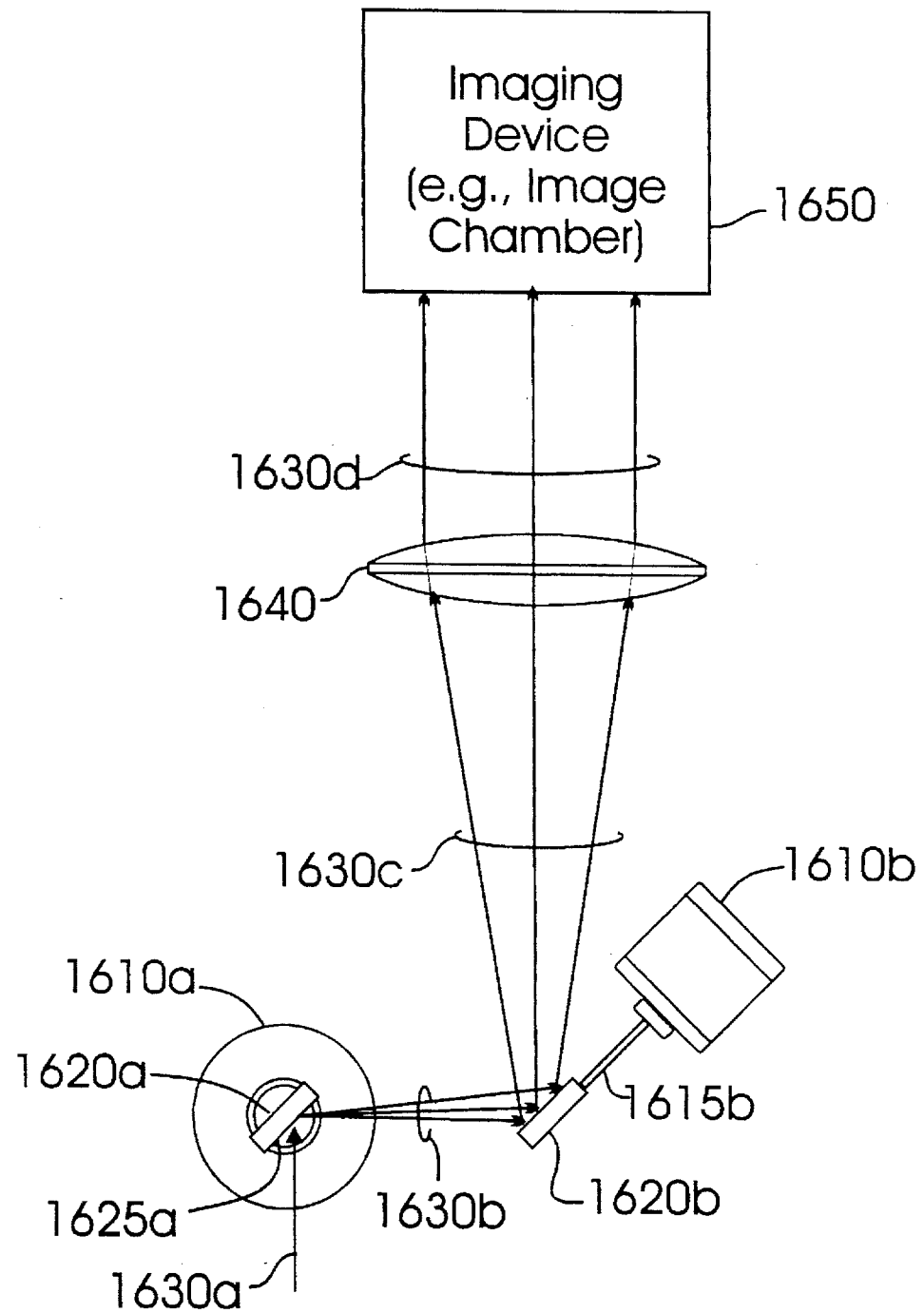
FIG. 16 is a diagram illustrating two-dimensional scanning of a beam for imaging in an imaging device such as an image chamber, according to the invention.

FIG. 16 is a diagram of apparatus suited for scanning a modulated beam to produce a complete, viewable three-dimensional image in a gaseous imaging chamber. A pair of frontal surface mirrors 1620a and 1620b are affixed to the shafts of a pair of galvanometers 1610a and 1610b, respectively, such that one galvanometer 1610a controls the angular position of one of the mirrors 1620a and the other galvanometer 1610b controls the angular position of the other mirror 1620b. An incident beam strikes the first mirror 1620a. The first galvanometer 1610a modulates the position of the first mirror 1620a such that the incident beam 1630a is deflected in-one linear dimension (X) and reflects as a one-dimensional "scanning" beam 1630b. The one-dimensional scanning beam 1630b then strikes the second mirror 1620b. The second galvanometer 1610b and mirror 1620b are positioned such that angular motion of the second mirror 1620b causes further scanning of the one-dimensional scanning beam 1630b in a second linear dimension (Y), thereby producing a resultant two-dimensional scanning beam 1630c. This two-dimensional scanning beam 1630c is divergent, however. That is, rays of the beam 1630c form an expanding cone shape as they travel away from the deflection apparatus (galvos and mirrors). In order to convert the rays of the divergent two-dimensional scanning beam 1630c into a parallel-ray two-dimensional scanning beam 1630d, a converging optical element is used. (Although shown as a hi-convex lens, more elaborate converging optical arrangements may be employed. Such arrangements are well known in the art. ) Intensity/color modulation of the incident beam controls the intensity/color of the resultant image. Further, high-speed pulsed modulation of the beam may be employed to provide "Z-axis" (depth) control as described hereinabove with respect to FIGS. 14a, 14b and The parallel-ray scanning beam is directed into an imaging device (e.g., active multi-planar optical element or gaseous imaging chamber) to produce a three-dimensional image. Three-dimensional image formation using an active multi-planar optical element has already been described hereinabove with respect to FIG. 13. Three-dimensional image formation in an imaging chamber is now describe with respect to FIG. 17.

Figure 17:
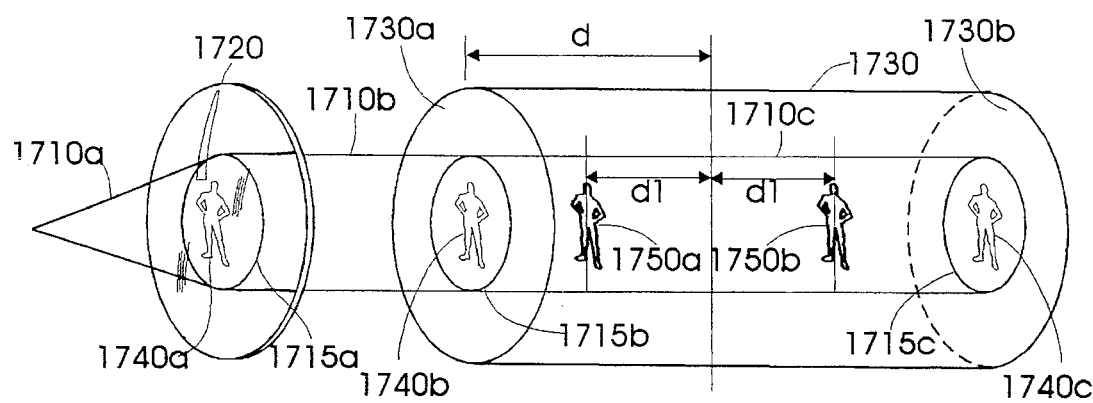
FIG. 17 is a diagram illustrating three-dimensional image formation in a gaseous imaging chamber, according to the invention.

FIG. 17 is a diagram illustrating formation of a three-dimensional image in a gas-filled imaging chamber 1730. A modulated, divergent, two-dimensional scanning beam 1710a is converged with a converging optical element 1720 to produce a parallel-ray modulated scanning beam 1710b. Outline 1715a indicates the extent of the scanning beam 1710a at the converging optical element 1720, and a two-dimensional projection 1740a of the image to be formed at a given depth in the imaging chamber 1730 is shown on the converging optical element 1720 for illustrative purposes. Similarly, outlines 1715b and 1715c represent the extent of the parallel-ray scanning beam 1710b at near and far mirrored surfaces 1730a and 1730b of the chamber, respectively. Two-dimensional projections 1740b and 1740c are also shown at the near and far mirrored surfaces 1730a and 1730b, respectively, of the imaging chamber 1730 for illustrative purposes only. Assuming that the source beam (1710a) is modulated as described with respect to FIG. 14b to cause pulse reinforcement within the imaging chamber 1730, a pair of viewable images 1750a and 1750b in the shape of the two-dimensional scan (as shown in projection as 1740a,b,c) are formed in the chamber 1730, space equidistantly ("d1") from the centerline of the chamber. By changing the modulating pulse pattern on the scanning beam and by simultaneously altering the two-dimensional scanning pattern, different scanning patterns (and different corresponding visible patterns) will be formed at different depths in the imaging chamber, thereby permitting full three-dimensional image generation.

Since the three-dimensional images are always produced in pairs, only one of the images is likely to be used. It is possible to "hide" the redundant image either by blocking that portion of the imaging chamber, or by applying bias potential to the imaging gas only in the vicinity of the desired image.

It is also possible to eliminate the extraneous "mirror" image by replacing the first mirrored surface (1730a) and by lengthening the repetition period of the scanning beam. However in doing this, the bias threshold becomes much harder to establish.

Figure 18:
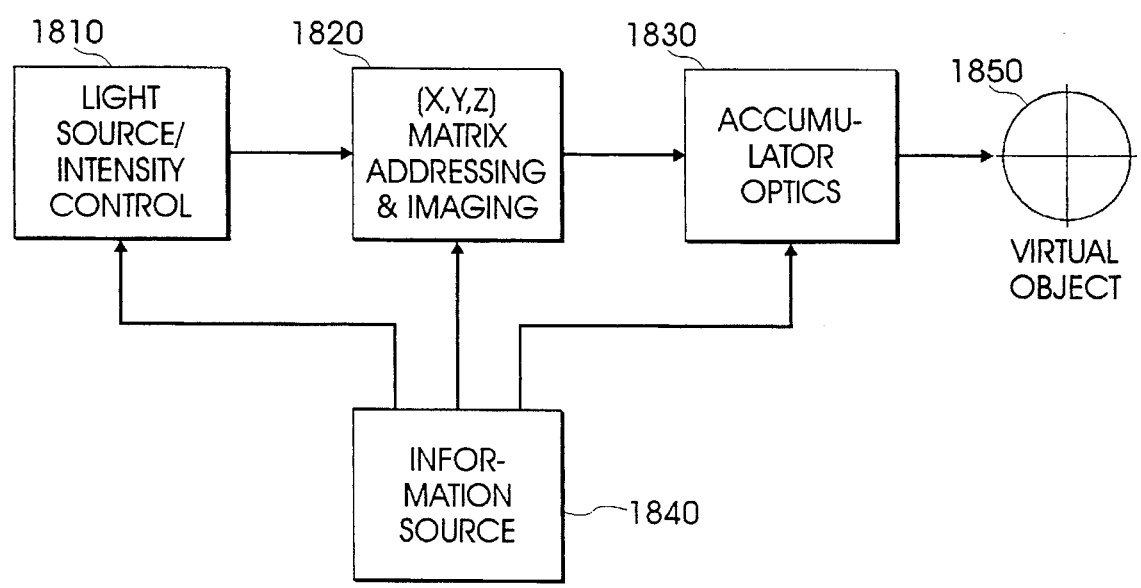
FIG. 18 is a generalized block diagram of a technique for forming three-dimensional volumetric images, according to the invention.

FIG. 18 is a block diagram showing a generalized system for three-dimensional volumetric imaging. (This, of course, excludes passive image generation techniques such as simple film holography). In order to generate three-dimensional volumetric images it is necessary to provide a light source and intensity control 1810 (see, e.g., the apparatus described with respect to FIG. 9). The light source is then processed in a functional block 1820 to provide three-dimensional addressability and to "precipitate" or form a visible image. Optional accumulator (image translation) optics 1830 (see, e.g., FIGS. 7a and 7b) can then be used to reposition the image to a desired position, producing a virtual three-dimensional object 1850 in space. An information source 1840 (e.g., image computing apparatus) provides control of the various parts of the system.

Based upon the techniques described hereinabove and assuming a laser illumination source, a table of techniques suited to three-dimensional volumetric image generation is set forth below in TABLE 1 (each row across the table represents a given combination of X, Y and Z addressing and image formation techniques):

TABLE 1

| Volumetric Imaging Combinations | | | |
|---|---|---|---|
| X addressing | Y addressing | Z addressing | Image formation |
| Galvo/mirror | Galvo/mirror | Beam modulation | Imaging Chamber or Passive MPOE (Imaging mode) |
| AOBD | Galvo/mirror | Beam modulation | (same as above) |
| Galvo/mirror | AOBD | Beam modulation | (same as above) |
| AOBD | AOBD | Beam modulation | (same as above) |
| Galvo/mirror or AOBD | Galvo/mirror or AOBD | Active MPOE (see FIGS. 11a, 13) | Active MPOE (see FIGS. 11a, 13) |

TABLE 1-continued

Volumetric Imaging Combinations

| X addressing | Y addressing | Z addressing | Image formation |
|---|---|---|---|
| Galvo/mirror or AOBD | Active MPOE #1 (reflective) | Active MPOE #2 (FIGS. 11a, 13) | Active MPOE #2 (FIGS. 11a, 13) |

TABLE 1, above, lists some exemplary ones of the many possible combinations suggested by the techniques described hereinabove. It is by no means comprehensive, and it is fully within the spirit and scope of the invention that the above-described techniques be used in any suitable combination to achieve the desired result.

What is claimed is:

1. A method of displaying a three-dimensional volumetric image, comprising:

providing a first concave reflector, said reflector having a mirror finish on a concave surface thereof, and a first centrally located opening;

providing a second concave reflector, said reflector having a mirror finish on a concave surface thereof, and a second centrally located opening;

positioning the first concave reflector relative to the second concave reflector such that the mirror finishes of the two concave reflectors face one another and such that the first and second centrally located openings in the two reflectors are coaxially aligned; and forming a three-dimensional image inside the second opening in the second concave reflector to produce a virtual image at the first opening in the first concave reflector;

wherein:

the first concave reflector comprises two reflector segments positioned diametrically opposite one another about the first opening in the first concave reflector; and the second concave reflector comprises two reflector segments positioned diametrically opposite one another about the second opening in the second concave reflector and positioned such that the two reflector segments of the second concave reflector are aligned axially above the two reflector segments of the first concave reflector;

further comprising:

defining a viewing line perpendicular to and intersecting a centerline extending through a center of the first opening in the first concave reflector and a center of the second opening in the second reflector, said viewing line being oriented to align with the reflector segments;

defining an observer position external to the reflector segments; and positioning the first and second concave reflectors so that the viewing line extends towards the observer;

wherein:

the positioning of the first and second reflectors is accomplished by sensing the observer position and by rotationally positioning the first and second reflectors with a motor to change their angular position until the viewing line extends towards the observer.

2. A method according to claim 1, further comprising:

providing a third concave reflector similar to the first concave reflector;

providing a fourth concave reflector similar to the second concave reflector;

positioning the third concave reflector relative to the fourth concave reflector such that concave mirrored surface thereof face one another and such that a third centrally located opening in the third concave reflector is coaxially aligned with a fourth centrally located opening in the fourth concave reflector; and positioning the third and fourth concave reflectors above the first and second concave reflectors such that the third and fourth openings in the third and fourth concave reflectors are coaxially aligned with the first and second openings in the first and second concave reflectors.

3. A method of displaying a three-dimensional volumetric image, comprising:

providing a first concave reflector, said reflector having a mirror finish on a concave surface thereof, and a first centrally located opening;

providing a second concave reflector, said reflector having a mirror finish on a concave surface thereof, and a second centrally located opening;

positioning the first concave reflector relative to the second concave reflector such that the mirror finishes of the two concave reflectors face one another and such that the first and second centrally located openings in the two reflectors are coaxially aligned; and forming a three-dimensional image inside the second opening in the second concave reflector to produce a virtual image at the first opening in the first concave reflector;

wherein:

the first concave reflector comprises two reflector segments positioned diametrically opposite one another about the first opening in the first concave reflector; and the second concave reflector comprises two reflector segments positioned diametrically opposite one another about the second opening in the second concave reflector and positioned such that the two reflector segments of the second concave reflector are aligned axially above the two reflector segments of the first concave reflector;

further comprising:

defining a viewing line perpendicular to and intersecting a centerline extending through a center of the first opening in the first concave reflector and a center of the second opening in the second reflector, said viewing line being oriented to align with the reflector segments;

defining an observer position external to the reflector segments;

positioning the first and second concave reflectors so that the viewing line extends towards the observer; and spinning the first and second concave reflectors about the centerline.

4. A method according to claim 3, further comprising:

providing a third concave reflector similar to the first concave reflector;

providing a fourth concave reflector similar to the second concave reflector;

positioning the third concave reflector relative to the fourth concave reflector such that concave mirrored surface thereof face one another and such that a third centrally located opening in the third concave reflector is coaxially aligned with a fourth centrally located opening in the fourth concave reflector; and positioning the third and fourth concave reflectors above the first and second concave reflectors such that the third and fourth openings in the third and fourth concave reflectors are coaxially aligned with the first and second openings in the first and second concave reflectors.

5. An image translation chamber, comprising:

a first concave reflector, said reflector having a mirror finish on a concave surface thereof, and a first centrally located opening, said concave reflector including two reflector segments positioned diametrically opposite one another about the first centrally located opening in the first concave reflector;

a second concave reflector, said reflector having a mirror finish on a concave surface thereof, and a second centrally located opening, said concave reflector including two reflector segments, positioned diametrically opposite one another about the second centrally located opening in the second concave reflector; and said first and second concave reflectors being positioned such that the mirror finishes thereof face one another, such that the first and second openings in the first and second concave reflectors are coaxially aligned, and such that the reflector segments of the second concave reflector are positioned opposite and aligned with the reflector segments of the first concave reflector;

further comprising:

means for rotating the first and second concave reflectors in unison about a centerline extending through a center of the first opening in the first concave reflector and a center of the second opening in the second reflector.

6. An image translation chamber according to claim 5, further comprising:

a viewing line defined perpendicular to the centerline and oriented in alignment with the reflector segments;

means for sensing an observer position and controlling the rotation of the first and second concave reflectors about the centerline to cause the viewing line to extend towards the viewer position.

7. An image translation chamber, comprising:

a first concave reflector, said reflector having a mirror finish on a concave surface thereof, and a first centrally located opening, said concave reflector including two reflector segments positioned diametrically opposite one another about the first centrally located opening in the first concave reflector;

a second concave reflector, said reflector having a mirror finish on a concave surface thereof, and a second centrally located opening, said concave reflector including two reflector segments, positioned diametrically opposite one another about the second centrally located opening in the second concave reflector; and said first and second concave reflectors being positioned such that the mirror finishes thereof face one another, such that the first and second openings in the first and second concave reflectors are coaxially aligned, and such that the reflector segments of the second concave reflector are positioned opposite and aligned with the reflector segments of the first concave reflector;

further comprising:

means for spinning the first and second concave reflectors together about a centerline extending through a center of the first opening in the first concave reflector and a center of the second opening in the second reflector.

* * * * *